United States Patent
Li et al.

(10) Patent No.: US 12,543,243 B2
(45) Date of Patent: *Feb. 3, 2026

(54) MULTICAST/BROADCAST SERVICE FOR RADIO RESOURCE CONTROL IDLE/INACTIVE USER EQUIPMENT ON NEW RADIO Uu INTERFACE

(71) Applicant: INTERDIGITAL PATENT HOLDINGS, INC., Wilmington, DE (US)

(72) Inventors: Yifan Li, Conshohocken, PA (US); Pascal Adjakple, Great Neck, NY (US); Patrick Svedman, Stockholm (SE); Mohamed Awadin, San Diego, CA (US); Joseph Murray, Schwenksville, PA (US); Kyle Pan, Saint James, NY (US); Allan Tsai, Boonton, NJ (US); Jerome Vogedes, Milwaukee, WI (US); Zhuo Chen, Claymont, DE (US); Rocco Di Girolamo, Laval (CA); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/249,104

(22) PCT Filed: Oct. 15, 2021

(86) PCT No.: PCT/US2021/055138
§ 371 (c)(1),
(2) Date: Apr. 14, 2023

(87) PCT Pub. No.: WO2022/081948
PCT Pub. Date: Apr. 21, 2022

(65) Prior Publication Data
US 2023/0403759 A1 Dec. 14, 2023

Related U.S. Application Data

(60) Provisional application No. 63/250,328, filed on Sep. 30, 2021, provisional application No. 63/229,613, (Continued)

(51) Int. Cl.
*H04W 72/23* (2023.01)
*H04W 16/28* (2009.01)
(Continued)

(52) U.S. Cl.
CPC ......... *H04W 76/40* (2018.02); *H04W 16/28* (2013.01); *H04W 72/232* (2023.01); *H04W 76/20* (2018.02)

(58) Field of Classification Search
CPC . H04W 76/40; H04W 76/20; H04W 74/0833; H04W 72/232; H04W 72/12;
(Continued)

(56) References Cited

U.S. PATENT DOCUMENTS

| | | | |
|---|---|---|---|
| 9,729,295 B2 * | 8/2017 | Zhang | H04L 1/1861 |
| 2021/0051571 A1 * | 2/2021 | Xu | H04W 72/04 |
| 2021/0105585 A1 * | 4/2021 | Shrivastava | H04L 5/005 |

OTHER PUBLICATIONS

Huawei et al: "Discussion on multicast support for Idle/Inactive UEs", 3GPP Draft; RI-2005272, 3rd Generation Partnership Project (3GPP), Mobile Competence Centre; 650, Route Des Lucioles; F-06921 Sophia-Antipolis Cedex ; FRANCE ' vol. RAN WGI, No. E-meeting; Aug. 17, 2020-Aug. 28, 2020, Aug. 8, 2020.
(Continued)

*Primary Examiner* — Wei Zhao
(74) *Attorney, Agent, or Firm* — Flaster Greenberg P.C.

(57) ABSTRACT

Multicast/Broadcast Service (MBS) for user equipments (UE) in Radio Resource Control (RRC) idle/inactive modes
(Continued)

via signally of MBS frequency ranges and/or switching between frequency ranges as required. Bandwidth Part (BWP) operation for MBS in RRC IDLE and RRC INACTIVE states may be implemented using a dedicated MBS BWP or by sharing a frequency range with other operations. An MBS frequency range may be wider or narrower than an initial BWP used by a UE, for example. MBS frequency range configure may be achieved in a number of ways, such as via Control Resource Set (CORESET), search space, and/or PDCCH monitoring occasions pattern settings for MBS in RRC idle/inactive. Downlink scheduling without dynamic grant for MBS in RRC idle/inactive may include configured scheduling and/or semi-persistent scheduling. Downlink repetition for MBS in RRC idle/inactive may include PDSCH repetition and/or PDCCH repetition.

20 Claims, 34 Drawing Sheets

Related U.S. Application Data filed on Aug. 5, 2021, provisional application No. 63/185,481, filed on May 7, 2021, provisional application No. 63/091,990, filed on Oct. 15, 2020.

(51) Int. Cl.
*H04W 72/232* (2023.01)
*H04W 76/20* (2018.01)
*H04W 76/40* (2018.01)

(58) Field of Classification Search
CPC ..... H04W 72/04; H04W 16/28; H04W 48/14; H04W 74/083; H04W 72/23; H04L 5/005
See application file for complete search history.

(56) References Cited

OTHER PUBLICATIONS

Samsung: "On Basic functions for broadcast/multicast for RRC_IDLE/RRC_INACTIVE UEs", 3GPP Draft; RI-2006175, 3rd Generation Partnership Project (3GPP), Mobile Competence Centre; 650, Route Des Lucioles; F-06921 Sophia-Antipolis Cedex ; France vol. RAN WGI, No. e Meeting; Aug. 17, 2020-Aug. 28, 2020, Aug. 7, 2020.

Vivo: "Discussion on basic functions for 1-16 broadcast/multicast for RRC_IDLE/RRC_INACTIVE UEs", 3GPP Draft; RI-2005408, 3rd Generation Partnership Project (3GPP), Mobile Competence Centre ; 650, Route Des Lucioles ; F-06921 Sophia-Antipolis Cedex; France ' vol. RAN WGI, No. E-Meeting; Aug. 17, 2020-Aug. 28, 2020, Aug. 8, 2020.

* cited by examiner

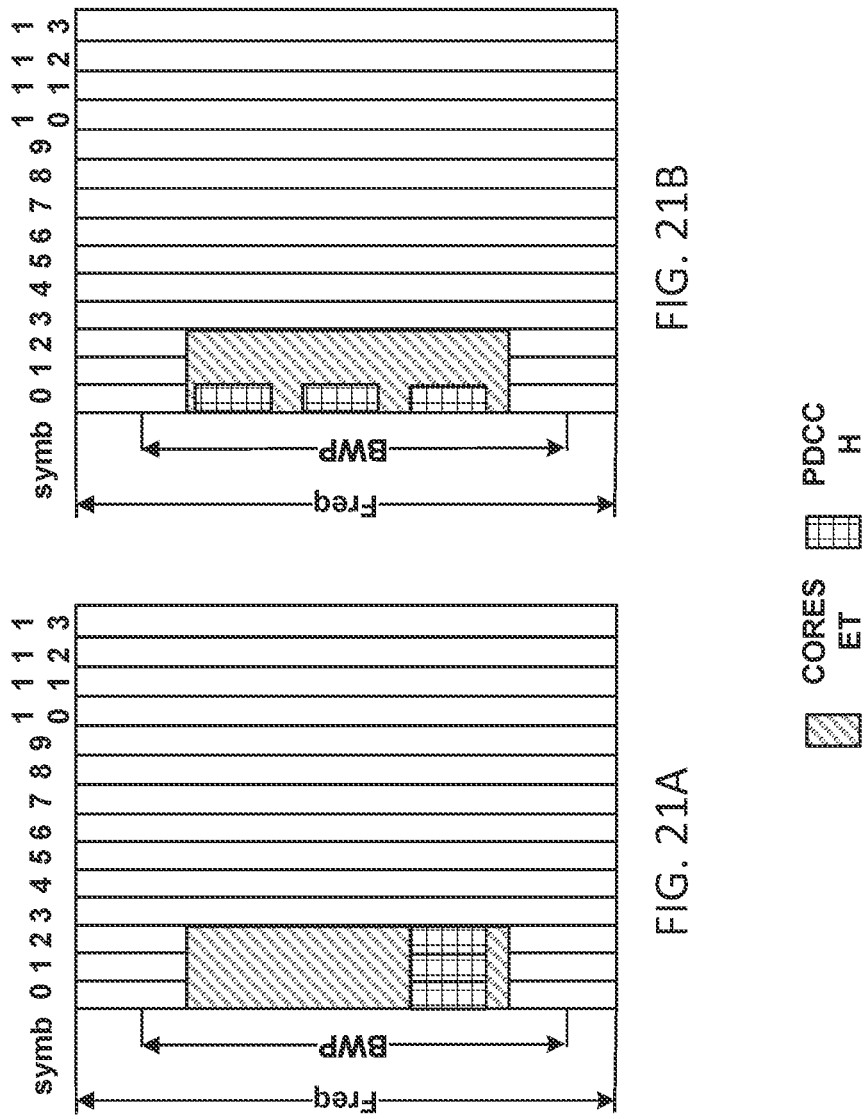

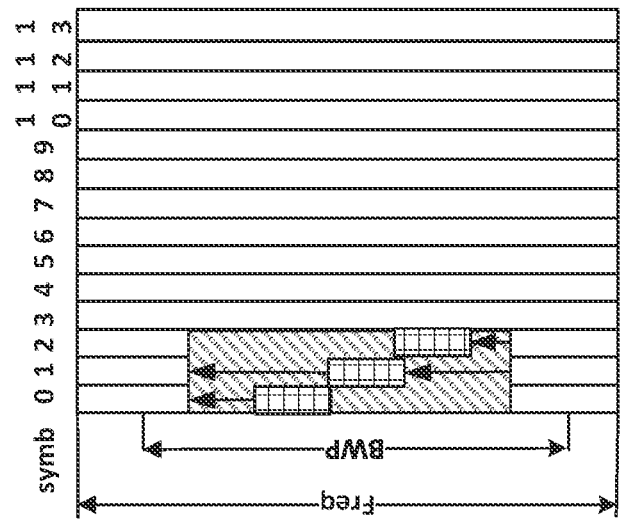
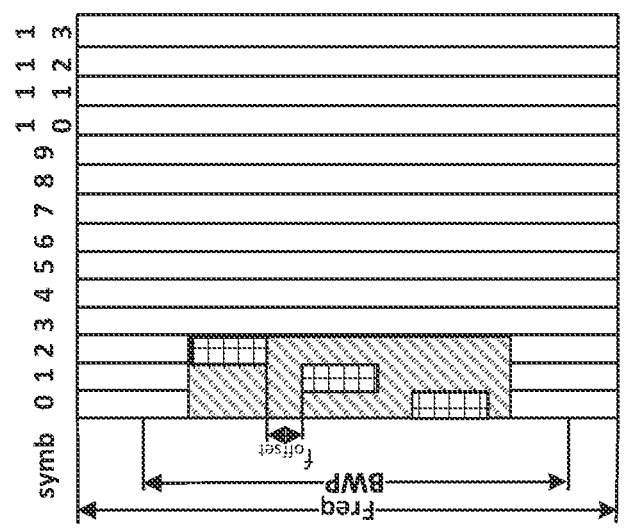

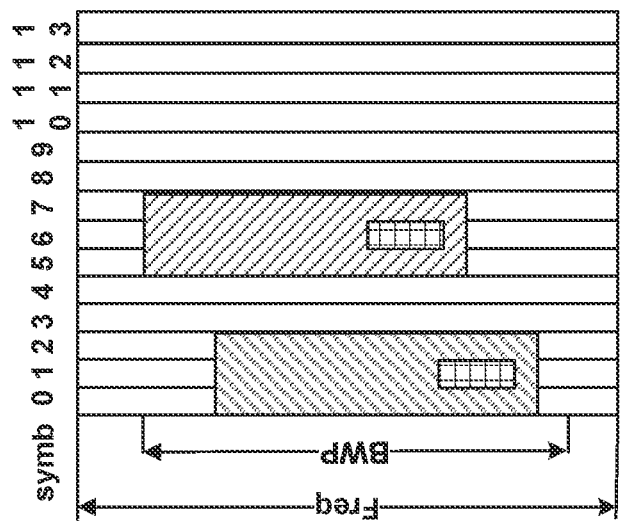
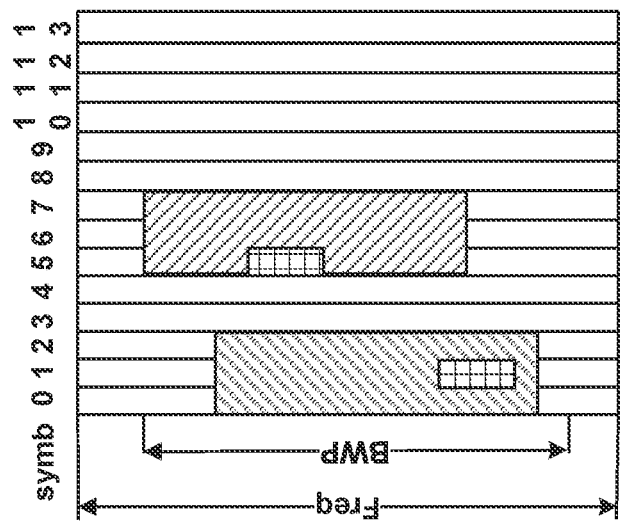
FIG. 22A
FIG. 22B

MULTICAST/BROADCAST SERVICE FOR RADIO RESOURCE CONTROL IDLE/INACTIVE USER EQUIPMENT ON NEW RADIO Uu INTERFACE

CROSS-REFERENCE TO RELATED APPLICATIONS

This application is the National Stage Application of International Patent Application No. PCT/US2021/055138, filed Oct. 15, 2021, which draws priority from: U.S. Provisional Pat. App. No. 63/091,990 filed Oct. 15, 2020, titled MBS for RRC idle inactive UEs on new radio Uu interface; U.S. Provisional Pat. App. No. 63/185,481 filed May 7, 2021, titled MBS for RRC idle inactive UEs on new radio Uu interface; U.S. Provisional Pat. App. No. 63/229,613 filed Aug. 5, 2021, titled MBS for RRC idle inactive UEs on new radio Uu interface; and U.S. Provisional Pat. App. No. 63/250,328 filed Sep. 30, 2021, titled Multicast/broadcast service for radio resource control idle/inactive user equipment on new radio Uu interface.

BACKGROUND

This disclosure pertains to idle state and inactive state operations of equipment in new radio networks.

SUMMARY

Multicast/Broadcast Service may be accommodated for user equipments (UEs) in Radio Resource Control (RRC) idle/inactive modes via signally of MBS frequency ranges and/or switching between frequency ranges as required. For example, Bandwidth Part (BWP) operation for MBS in RRC_IDLE state and RRC_INACTIVE may be implemented using a dedicated MBS BWP or by sharing a frequency range with other operations. An MBS frequency range may be wider or narrower than an initial BWP used by a UE.

MBS frequency range configure may be achieved in a number of ways, such as via Control Resource Set (CORESET), search space, and/or PDCCH monitoring occasions pattern settings for MBS in RRC idle/inactive.

Downlink scheduling without dynamic grant for MBS in RRC idle/inactive may include configured scheduling and/or semi-persistent scheduling. Downlink repetition for MBS in RRC idle/inactive may include PDSCH repetition and/or PDCCH repetition.

This summary is provided to introduce a selection of concepts in a simplified form that are further described below in the Detailed Description. This Summary is not intended to identify key features or essential features of the claimed subject matter, nor is this summary intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 21A shows an example of MBS PDCCH repetition within a Control Resource Set (CORESET) with the association TDM-ed.

FIG. 21B shows an example of MBS PDCCH repetition within a CORESET with the association frequency-division multiplexed (FDM-ed).

FIG. 21C shows a first example of MBS PDCCH repetition within a CORESET with the association both TDM-ed and FDM-ed.

FIG. 21D shows a second example of MBS PDCCH repetition within a CORESET with the association both TDM-ed and FDM-ed.

FIG. 22A shows an example of MBS PDCCHs repeated in multiple CORESETs with no association.

FIG. 22B shows an example of MBS PDCCHs repeated in multiple CORESETs with the same relative location within the CORESET.

DETAILED DESCRIPTION

Abbreviations

Figure 1:
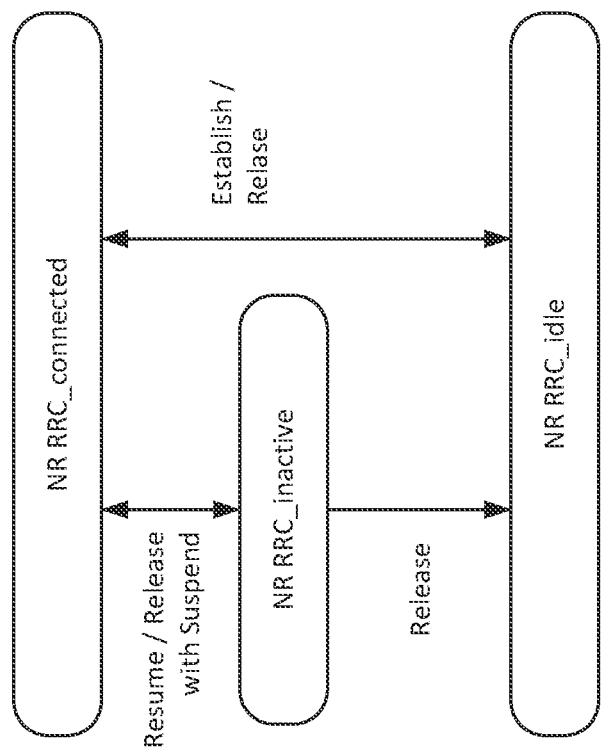
FIG. 1 is a block diagram of a user equipment (UE) state machine and state transitions in New Radio (NR).

Table 5 of the Appendix lists selected abbreviations used herein.

LTE MBMS

LTE MBMS (Multimedia broadcast multicast services) supports broadcast/multicast services in a cellular system, where the same content is simultaneously transmitted to the UEs located in an area.

In LTE, MBMS service area is defined as the area that all the UEs receive the same broadcast/multicast services. An MBMS service area may comprise one or multiple cells.

Two types of mechanism are supported in LTE for broadcast/multicast services: MBSFN (Multicast-Broadcast Single Frequency Network), and SC-PTM (Single-Cell Point to Multipoint).

LTE MBSFN

MBSFN is introduced to LTE in Rel-9, which targets the use case when the MBMS service is of interest over a larger area, e.g., for TV broadcasting. Different cells within the same MBSFN area are mutually time aligned and broadcast the identical information. Therefore, from a UE perspective, the transmissions received from multiple cells can be seen as a single transmission received from one cell subject to severe multi-path propagation as long as the cyclic prefix is large enough. The UE does not need to know which cell are actually involved in the transmission.

In LTE MBSFN, broadcast/multicast services are transmitted on the dedicated physical channel PMCH (Physical Multicast Channel) in the dedicated MBSFN subframes. An MBSFN subframe consists of two parts: a control region which is used for transmission of regular unicast L1/L2 control signaling, and an MBSFN region which is used for transmission of the multicast channel. Within one MBSFN subframe, all the MBSFN transmissions correspond to the same MBSFN area. However, the MBSFN transmissions in different subframes may correspond to different MBSFN areas.

To support coherent demodulation for the received MBSFN transmission, MBSFN area specific MBSFN reference signals are transmitted in the MBSFN subframe. All the cells within the same MBSFN area transmit the MBSFN reference signals at the same time-frequency location and with the same reference-symbol values. Since only one single MBSFN reference signal is transmitted in the MBSFN subframe, MIMO scheme is not supported in LTE MBSFN.

LTE SC-PTM

SC-PTM is introduced to LTE in release 13 in order to support MBMS services when the MBMS service is of interest in a single cell or in a small area consisting of a few cells. Different from the MBSFN, SC-PTM transmissions reuse the PDSCH (Physical Downlink Shared Channel).

In LTE, both the RRC connected UEs and the RRC idle UEs can receive the broadcast SC-PTM transmission if the UE is interested. Two types of logical channels, single cell multicast traffic channel (SC-MTCH) and single cell multicast control channel (SC-MCCH), are defined to support the SC-PTM transmission. Both logical channels are mapped to the downlink shared channel (DL-SCH).

SC-PTM transmission is transmitted on SC-MTCH. Similar to the unicast transmission, the transmission of SC-MTCH is dynamically scheduled by the DCI. G-RNTI (Group Radio Network Temporary Identifier) is used to scramble the DCI scheduling the SC-PTM transmission. For different MBMS services, different G-RNTIs are used for UE to receive the SC-PTM transmission that the UE is interested in.

Control information such as the G-RNTIs used for different MBMS services are provided on the SC-MCCH logical channel type, which is also dynamically scheduled by a DCI using the SC-RNTI with the fixed value FFFB.

System information block 20 (SIB 20) carries the information of when and where to receive the SC-MCCH.

In LTE SC-PTM, HARQ (Hybrid Automatic Repeat Request) feedback and CSI (Channel State Information) reports are not supported. Consequently, only the transmission modes 1-3, which do not rely on feedback, are supported.

NR Uu Broadcast Groupcast Use Cases

In NR (New Radio), Uu broadcast/groupcast is identified to be beneficial in many use cases, such as V2X (Vehicle-to-everything) communication, public safety, video, and audio distribution, IIoT (Industrial Internet of Things), media streams, various types of content distribution etc.

Comparing to the LTE, the NR Uu broadcast/groupcast use cases usually have a smaller communication range and require higher reliability and lower latency in many scenarios.

NR Downlink Scheduling Mechanism

In NR, DCI (Downlink Control Information) format 1_1 is used for the scheduling of PDSCH (Physical Downlink Share Channel) for unicast transmission in one cell. The scheduling DCI carries the information such as time and frequency resource assignments, HARQ related information, feedback resource assignment, etc.

For a UE, the transmission of DL scheduling is a priori unknown to the UE. The UE need to blindly detect the DCI from the gNB. To reduce the effort of blind decoding and therefore save the power consumed, the UE is configured with the BWP (Bandwidth Part), CORESET (Control Resource Set), search space information by the gNB. So, the UE only need to perform blind decoding within the configured time and frequency region and does not need to search the whole spectrum.

NR RRC Idle State and RRC Inactive State

In NR, RRC inactive state is defined additional to the RRC connected state and RRC idle state as shown in FIG. 1.

In RRC inactive state, a UE will store the UE inactive AS context to help the UE to perform a faster transiting to the RRC connected state comparing to the UE in RRC idle state.

However, in RRC idle or inactive state, a UE can only support very limited functionalities, e.g., receive paging, receive system information, perform initial access, perform RRM measurement, etc. In RRC idle or inactive state, the UE operates with the initial BWP to support the abovementioned functionalities.

Problem Statement

Problem Statement 1: BWP for MBS in RRC Idle or Inactive State.

In NR, a UE can only operate in the initial BWP when the UE is in RRC idle/inactive state. In RRC idle, the size of the initial BWP is the same as the CORESET 0 in frequency. Similarly, in RRC inactive, the size of the initial BWP is the same as that of the CORSET 0 in frequency, unless the initial BWP is configured otherwise. In unicast use case, considering that an RRC idle/inactive UE only supports very limited functionalities, e.g., receiving paging message and performing the RRM measurement, etc., the current initial BWP is enough. However, when also considering providing Multicast/Broadcast Service (MBS) for RRC idle/inactive UEs, the current initial BWP may not be enough since the transmissions of SSB, CORESET 0, PDSCH associated with SI-RNTI, etc. have already occupied many resources in the initial BWP. Therefore, enhancements on initial BWP are needed to support MBS in RRC idle/inactive state.

Problem Statement 2: MBS Scheduling in RRC Idle or Inactive State.

To receive the MBS service in RRC idle/inactive state, a UE need to receive the scheduling information first. In current NR, gNB can only schedule and transmit paging and system information message to the UEs in RRC idle/inactive state. Mechanisms need to be introduced to support MBS for the UE in RRC idle/inactive state.

Problem Statement 3: Beam Sweeping for MBS in RRC Idle or Inactive State.

For MBS in RRC idle/inactive state, the gNB may not know the locations of the UEs receiving the MBS, and the gNB may not know which UEs are receiving the MBS. To help the gNB deliver the MBS to all the UEs that are under coverage, beam sweeping for MBS may be required similar to the case of unicast services particularly in higher frequencies considering the beam centric nature of NR RAT design. Mechanisms need to be introduced to support MBS beam sweeping.

Summary of Proposed Solutions

Various schemes for supporting MBS for the UEs in RRC idle state or RRC inactive state are described herein. For the sake of simplicity, we may use describe schemes in terms of cases wherein a UE in RRC inactive state to illustrate the proposed solutions. However, the proposed solutions and schemes in this disclosure can be also applied to support the UEs in RRC idle state to receive NR MBS and vice versa.

Herein, the term 'in RRC idle state or RRC inactive state' is referred as 'in RRC idle/inactive' for simplification purpose as well.

BWP for MBS in RRC Idle/Inactive

In NR, BWP is introduced to reduce the UE power consumption in both RRC connected state and RRC idle/inactive. In RRC idle/inactive, a UE operates with the initial BWP. To save power, the initial BWP bandwidth is usually very narrow since only very minimal functionalities are supported. To further support MBS in RRC idle/inactive, we disclose that the following enhancements on BWP may be adopted.

BWP Operation for MBS in RRC Idle/Inactive

MBS Transmission with Dedicated MBS BWP

Figure 2:
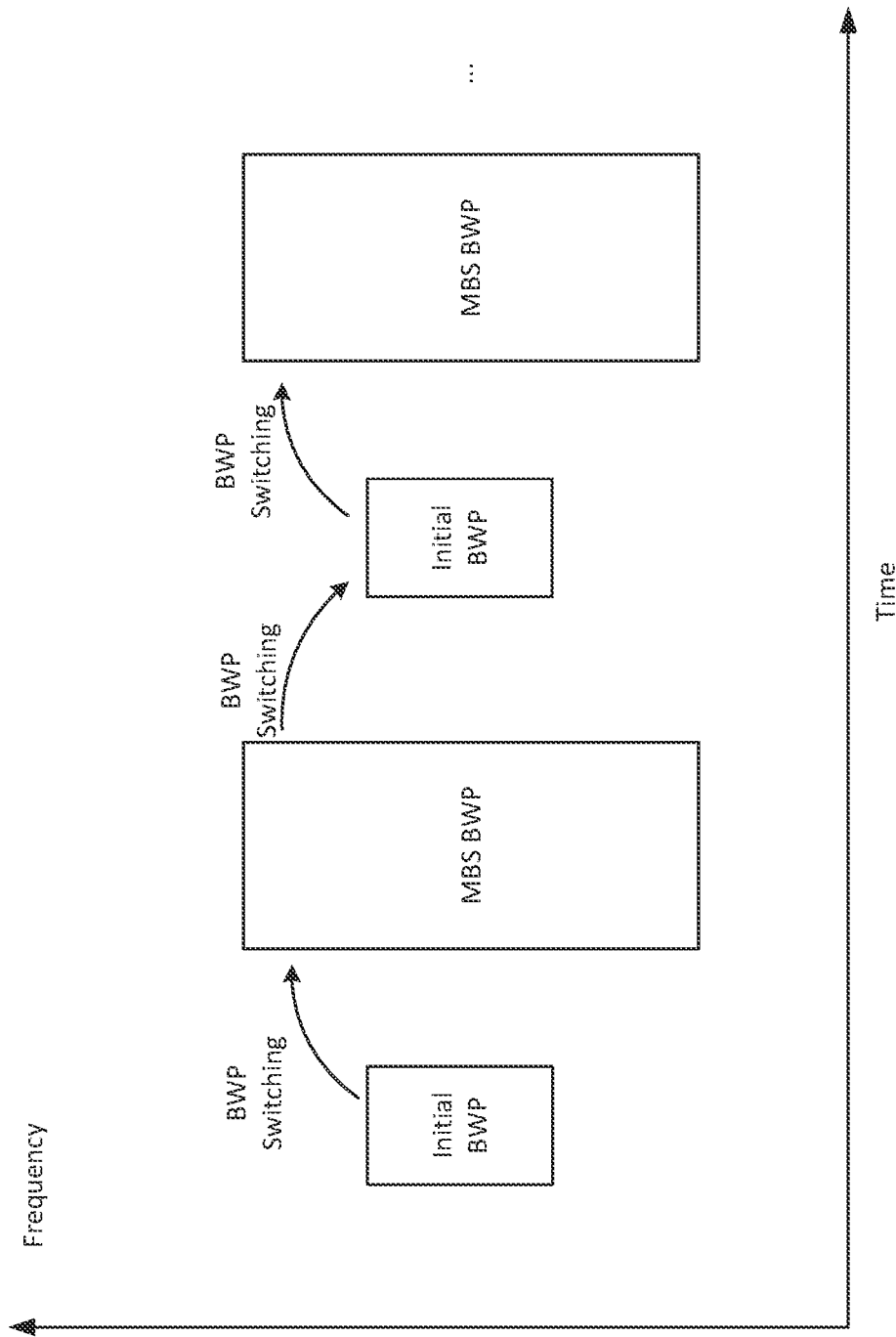
FIG. 2 is a time and frequency diagram of dedicated Multicast/Broadcast Service (MBS) Bandwidth Part (BWP) for Radio Resource Control (RRC) idle/inactive time-division multiplexed (TDM-ed) with other transmissions on the initial BWP.

In one scenario, a UE may be configured with a dedicated MBS BWP for RRC idle/inactive. The gNB may perform the transmissions on the initial BWP, e.g., paging, system information, etc., and the MBS transmissions, e.g., MBS-MCCH or MBS-MTCH on the MBS BWP in the time-division multiplexing (TDM) manner as shown in FIG. 2.

For example, a UE may be configured with a dedicated MBS BWP for RRC idle/inactive. The UE may be also configured with the time unit (TU) for monitoring and receiving the MBS transmission, where the time unit may be in unit of radio frame, radio subframe, slot or mini slot. The TU configured for MBS may be TDM-ed with the TUs for other transmission, e.g., TDM-ed with the UE's paging frame (PF), and TDM-ed with the SI-windows for the different system information messages, etc. In this case, the UE may switch between the initial BWP and the MBS BWP to receive the transmissions on the initial BWP and the MBS transmissions, respectively.

Figure 3:
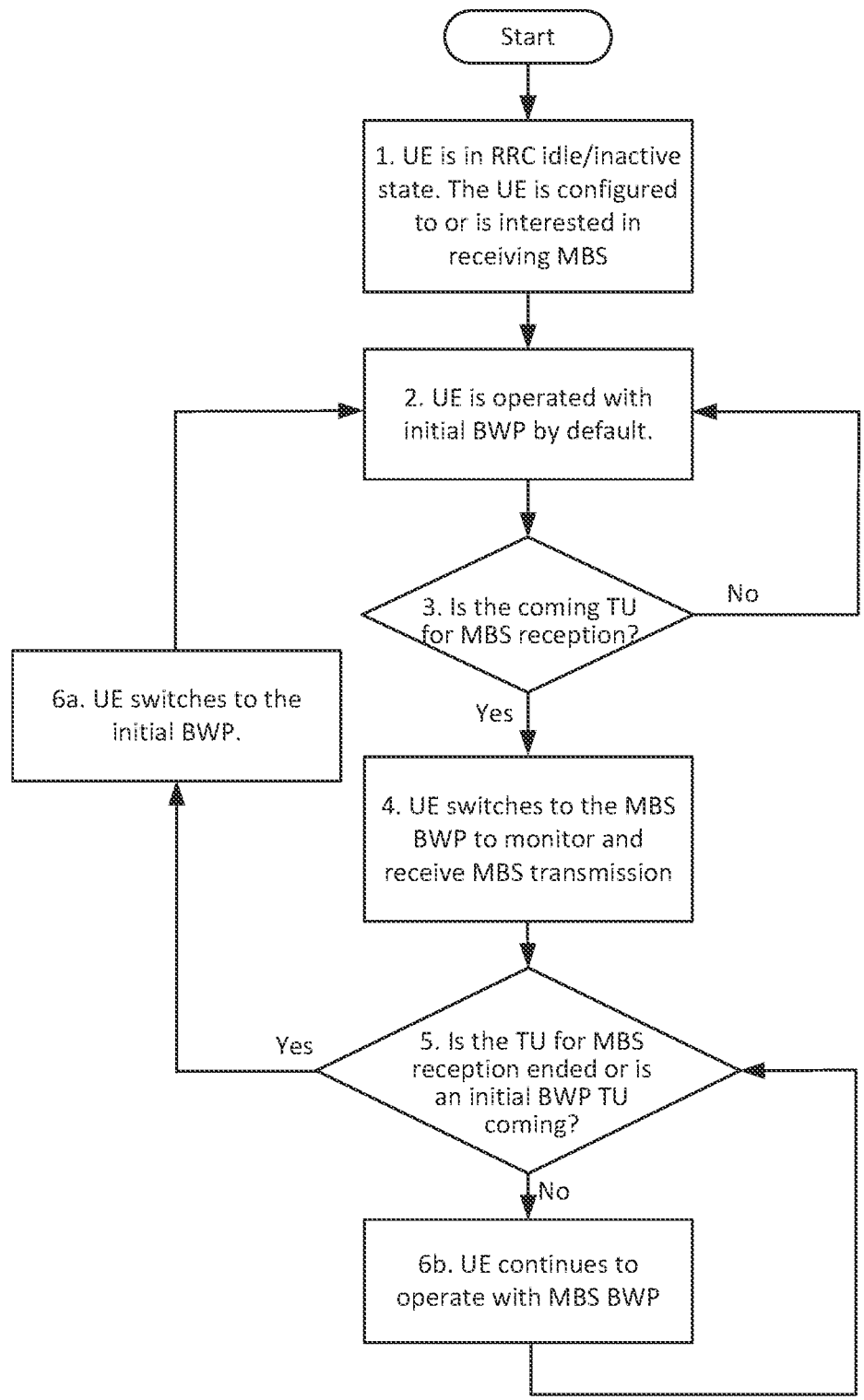
FIG. 3 is a flowchart of an example process for a UE receiving an MBS transmission with BWP switching between initial BWP and MBS BWP.

The flowchart in FIG. 3 shows the exemplary steps of a UE receiving MBS transmission with BWP switching between initial BWP and MBS BWP.

In step 1, a UE is in RRC idle/inactive state. The UE may be configured by the gNB to receive MBS or the UE may be interested in receiving certain MBS provide by the gNB. In this case, the UE may determine the MBS BWP and the TU to be used for monitoring and receiving the MBS from the gNB. The UE may also determine the initial BWP to be used.

In step 2, the UE may operate with the initial BWP by default. For example, the UE may monitor and detect if there is a paging message sent by the gNB or the UE may monitor and detect if there is system information update, etc.

In step 3, the UE may check if the coming TU is the TU used for the MBS reception. If the check result is no, the UE may continue to operate with the initial BWP and return to step 2.

In step 4, if the check result in step 3 is yes, the UE may perform BWP switching and switch from the initial BWP to the MBS BWP. The UE may monitor and receive the MBS transmission on the MBS BWP within the configured MBS TU.

In step 5, the UE may check if the current MBS TU is ended. Or, alternatively, the UE may periodically switch back initial BWP by checking if an initial BWP TU is coming. This may apply to the case that the duration of the MBS TU is longer that than the paging cycle or SIB/MIB cycle, or apply to the case that an MBS transmission may continue for a long time, e.g., when the user is listening to voice broadcast of a baseball game, etc.

In step 6*a*, if the check result in step 5 is yes, the UE may switch back to the initial BWP and return to the step 2.

In step 6*b*, if the check result in step 5 is no, the UE may continue to operate with the MBS BWP and return to step 5 to keep checking if the MBS TU is ended.

MBS Transmission with Narrower MBS Frequency Band

On one hand, operating MBS BWP and the initial BWP in the TDM-ed scheme may be a straightforward way to support MBS in RRC idle/inactive. However, frequent BWP switching which may be required, causing undesirable power consumption at the UE.

Figure 4:
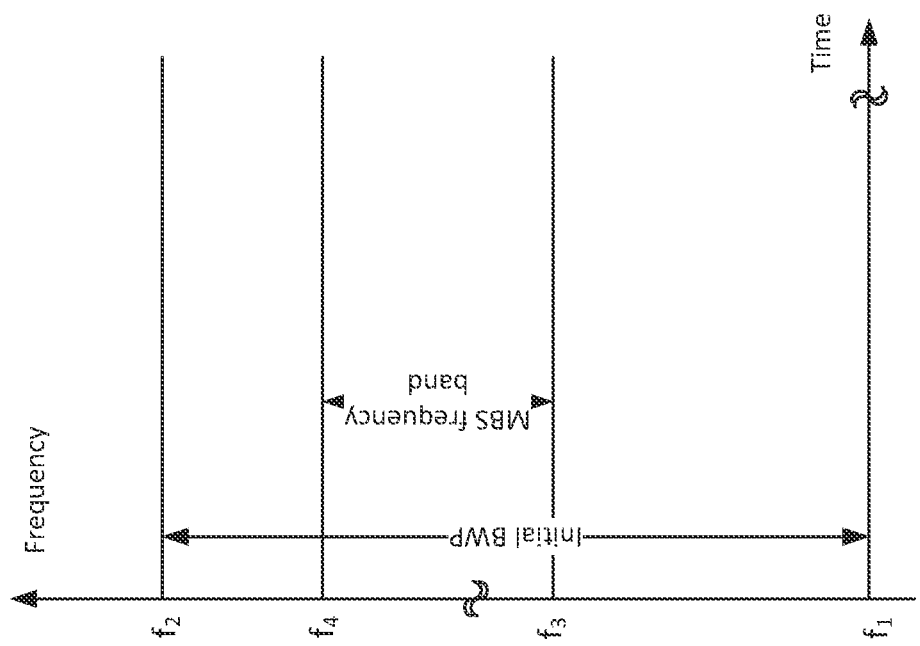
FIG. 4 is a time and frequency diagram of an example narrower MBS frequency band confined within an initial BWP.

As an alternative, we propose that the transmission of the MBS, e.g., MBS-MCCH or MBS-MTCH, may be fully overlapped or partially overlapped with other transmissions occurred on the initial BWP in time, e.g., the UE may simultaneously monitor the MBS transmission and the other transmissions occurred on the initial BWP. In one scenario, the UE may only need to receive the MBS with small packet in RRC idle/inactive. In this case, the UE may be configured with an MBS frequency band that is narrower than the initial BWP with the MBS frequency band falls into the initial BWP in frequency. An example of such MBS frequency band is shown in FIG. 4.

For example, in RRC idle/inactive, a UE may be configured with initial BWP with frequency range $[f_1, f_2]$. Such frequency range or frequency band may be common to UEs for delivering MBS services. In one example, the UE may determine the common frequency range $[f_1, f_2]$ based on the CORESET #0, i.e., the frequency location of the initial BWP equals to the frequency location of the CORESET #0 indicated in the MIB. In another example, the UE may determine the common frequency range $[f_1, f_2]$ through the SIB1, e.g., through the RRC configuration initialDownlinkBWP in the SIB1. The UE may be configured with the MBS frequency band with frequency range $[f_3, f_4]$, where $[f_3, f_4] \subseteq [f_1, f_2]$, e.g., the MBS frequency band may be configured with frequency size smaller than the initial BWP that is equal to the CORESET #0, or the MBS frequency band may be configured with frequency size smaller than the initial BWP that is configured by the SIB1.

The UE may monitor and receive the MBS transmission in the MBS TU configured for the UE within the configured MBS frequency band. The MBS TU may be fully overlapped or partially overlapped with the TUs for other transmissions occurred on the initial BWP in time.

In this example, if an MBS TU is not overlapped with other TUs on the initial BWP, the UE may switch from the initial BWP to the MBS frequency band to receive MBS transmission.

If the MBS TU is fully overlapped or partially overlapped with the TUs on the initial BWP, the UE may be operated with the initial BWP to receive the MBS transmission and the transmission on the initial BWP on the overlapped region. By doing this, the UE may avoid the switching in frequency therefore help the UE to save power. Note in the case, the UE is still operated with one BWP.

For the non-overlapped region in the MBS TU, in one approach, the UE may be operated with the MBS frequency band in such region and switch between the initial BWP and the MBS frequency band when there is a need, e.g., the UE may switch from the MBS frequency band to the initial BWP when an ongoing MBS TU starts to be overlapped with the initial BWP in time; or the UE may switch from the initial BWP to the MBS frequency band when an ongoing MBS TU is no longer to be overlapped with the initial BWP in time, etc.

In another approach, a UE may be operated with the initial BWP for the whole MBS TU as long as the TU has any overlapping with other TUs on initial BWP in time. In this approach, the UE does not need to perform the switching which can avoid the power consumed by the switching and can help the UE to reduce the transmission interruption due to the switching, e.g., if an MBS transmission is ongoing and the overlapping status changes, performing switching may cause interruption to the transmission.

Figure 5:
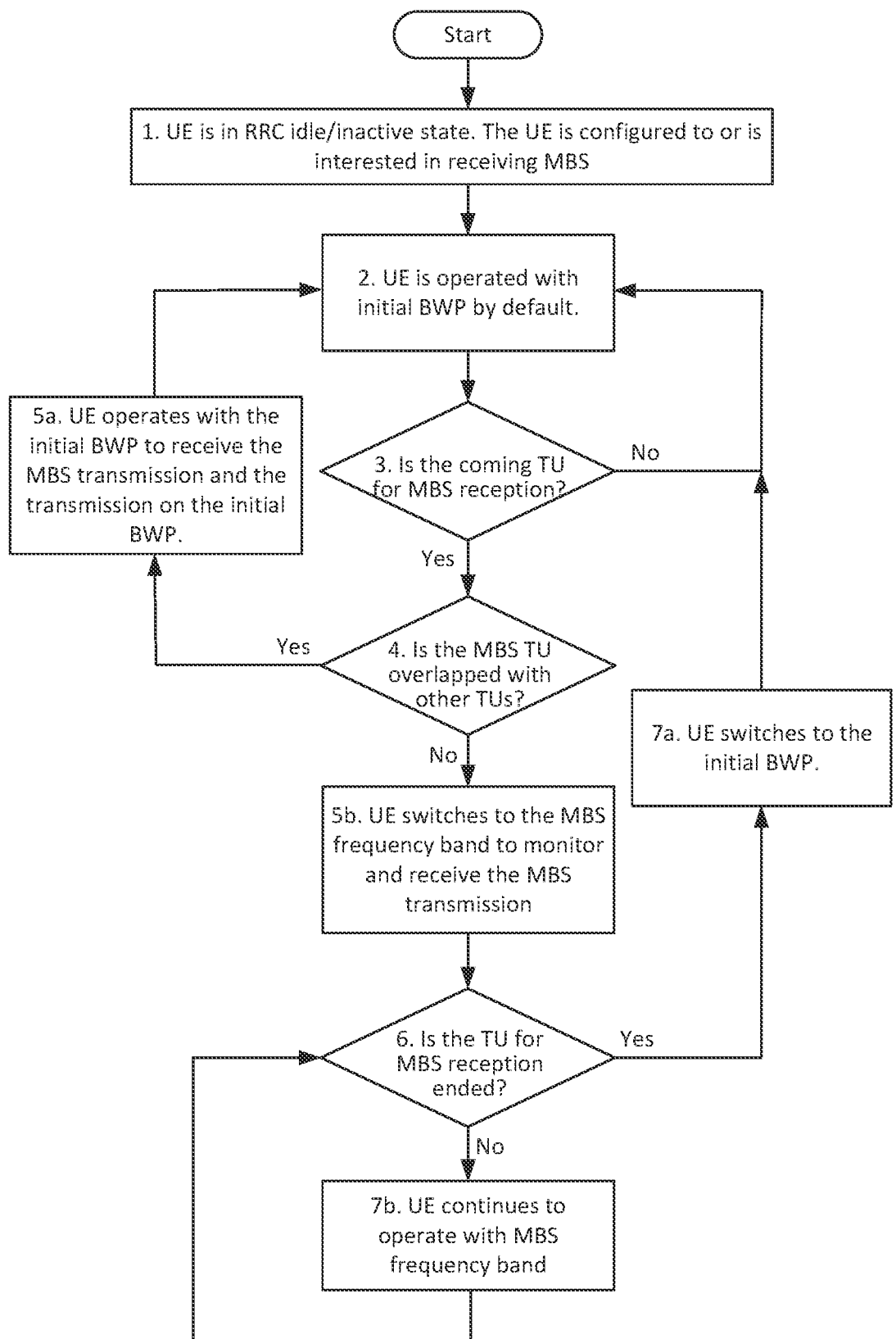
FIG. 5 is a flowchart of an example process for a UE receiving an MBS transmission with the MBS frequency band.

The flowchart in FIG. 5 shows the exemplary steps of a UE receiving MBS transmission with the MBS frequency band.

In step 1, a UE is in RRC idle/inactive state. The UE may be configured by the gNB to receive MBS or the UE may be interested in receiving certain MBS provide by the gNB. In this case, the UE may determine the MBS frequency band and the TU to be used for monitoring and receiving the MBS from the gNB. The UE may also determine the initial BWP to be used, e.g., initial BWP that is equal to the CORESET #0 configured by MIB or initial BWP configured by the SIB1, where the configured MBS frequency band is confined within the initial BWP in frequency.

In step 2, the UE may operate with the initial BWP by default. For example, the UE may monitor and detect if there is a paging message sent by the gNB or the UE may monitor and detect if there is system information update, etc.

In step 3, the UE may check if the coming TU is the TU used for the MBS reception. If the check result is no, the UE may continue to operate with the initial BWP and return to step 2.

In step 4, if the check result in step 3 is yes, the UE may further check if the MBS TU has overlapping in time with other TUs used to receive the transmissions on the initial BWP.

In step 5a, if the check result in step 4 is yes, e.g., the MBS TU is fully overlapped, or is partially overlapped with other TUs, etc., the UE may continue to operate with the initial BWP and receive the MBS transmission on the initial BWP. In this case, no switching in frequency is performed. Note in the case, the UE is still operated with one BWP while operating with two sets of configurations, i.e., configuration for initial BWP and configuration for MBS frequency band. For example, the UE may still determine the frequency location for the CORESET transmitted on the initial BWP based on the corresponding CORESET configuration and the initial BWP configuration. The UE may determine the frequency location for the CORESET transmitted on the MBS frequency band based on the corresponding CORESET configuration and the MBS frequency band configuration.

In step 5b, if the check result in step 4 is no, e.g., the MBS TU is not overlapped with other TUs, the UE may perform switching and switch from the initial BWP to the MBS frequency band. The UE may monitor and receive the MBS transmission on the MBS frequency band within the configured MBS TU. Or the UE may still remain in the initial BWP to receive the MBS transmission transmitted on the MBS frequency band (i.e., on common frequency range for MBS) to avoid frequency switching. In this case, step 6, step 7a and step 7b can be ignored.

In step 6, the UE may check if the current MBS TU is ended. Or, alternatively, the UE may check if the initial BWP TU has started.

In step 7a, if the check result in step 6 is yes, the UE may switch back to the initial BWP and return to the step 2.

In step 7b, if the check result in step 6 is no, the UE may continue to operate with the MBS frequency band and return to step 6 to keep checking if the MBS TU is ended. When a UE is operating with the narrower MBS frequency band for RRC idle/inactive, if the UE wants to receive MBS with large packet size, the UE may transit to the RRC connected state and receive MBS in RRC connected mode.

MBS Transmission with Wider MBS BWP

In another scenario, the UE may receive various MBS, e.g., MBS-MCCH or MBS-MTCH, in RRC idle/inactive, e.g., MBS with small packet size, MBS with large packet size, etc. In this case, a wider frequency band may be required to support MBS in RRC idle/inactive since the bandwidth of the existing initial BWP is limited and many resources have been already occupied. Note that the MBS BWP is one example of such wider MBS frequency band. Herein we use MBS BWP as the example for illustration purposes. All the embodiments disclosed herein for MBS BWP can be also applied for the MBS frequency band with changing MBS BWP to MBS frequency band. MBS BWP and MBS frequency band may be used interchangeably in the application.

Figure 6:
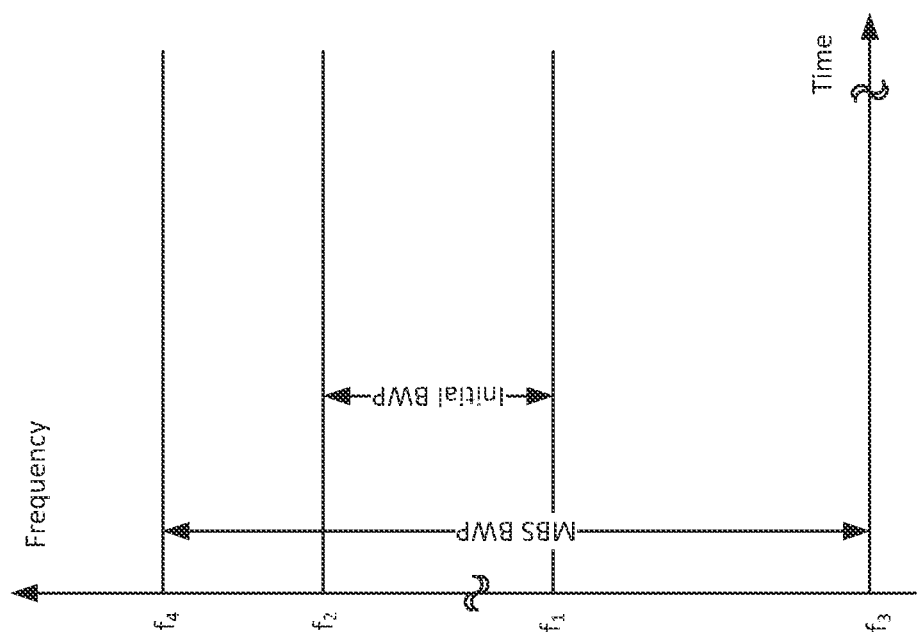
FIG. 6 is a time and frequency diagram of an example wider MBS BWP with the initial BWP confined within the MBS BWP.

To handle such scenario, we disclose that the UE may be configured with an MBS BWP that is wider than the initial BWP with the initial BWP falls into the MBS BWP in frequency. An example of such MBS frequency band is shown in FIG. 6.

In the example, the UE is configured with the initial BWP which spans between $[f_1, f_2]$. In one example, the UE may determine the frequency range $[f_1, f_2]$ based on the CORESET #0, i.e., the frequency location of the initial BWP is equal to the frequency location of the CORESET #0 indicated in the MIB. In another example, the UE may determine the frequency range $[f_1, f_2]$ through the SIB1, e.g., through the RRC configuration initialDownlinkBWP in the SIB1. The UE is also configured with the MBS BWP which spans between $[f_3, f_4]$, where $[f_1, f_2]$ S $[f_3, f_4]$, e.g., the MBS BWP may be configured with frequency size wider than the initial BWP configured by the SIB1 or wider than the initial BWP that is equal to the CORESET #0. When the MBS BWP is configured with frequency size wider than the initial BWP that is equal to the CORESET #0, the MBS BWP may have a frequency size smaller than the initial BWP configured by the SIB1, or the MBS BWP may have the same frequency size as the initial BWP configured by the SIB1. Alternatively, the MBS BWP may have a frequency size further wider than the initial BWP configured by the SIB1.

The UE may monitor and receive the MBS transmission in the MBS TU configured for the UE within the configured MBS BWP. The MBS TU may be fully overlapped or partially overlapped with the TUs for other transmissions occurred on the initial BWP in time.

In this example, if an MBS TU is not overlapped with other TUs on the initial BWP, the UE may perform BWP switching and switch from the initial BWP to the MBS BWP to receive MBS transmission.

If the MBS TU is fully overlapped or partially overlapped with the TUs on the initial BWP, in one approach, the UE may be operated with the MBS BWP to receive the MBS transmission and the transmission on the initial BWP. In this approach, the BWP switching is avoided, potentially saving the power consumed by the BWP switching.

Figure 7:
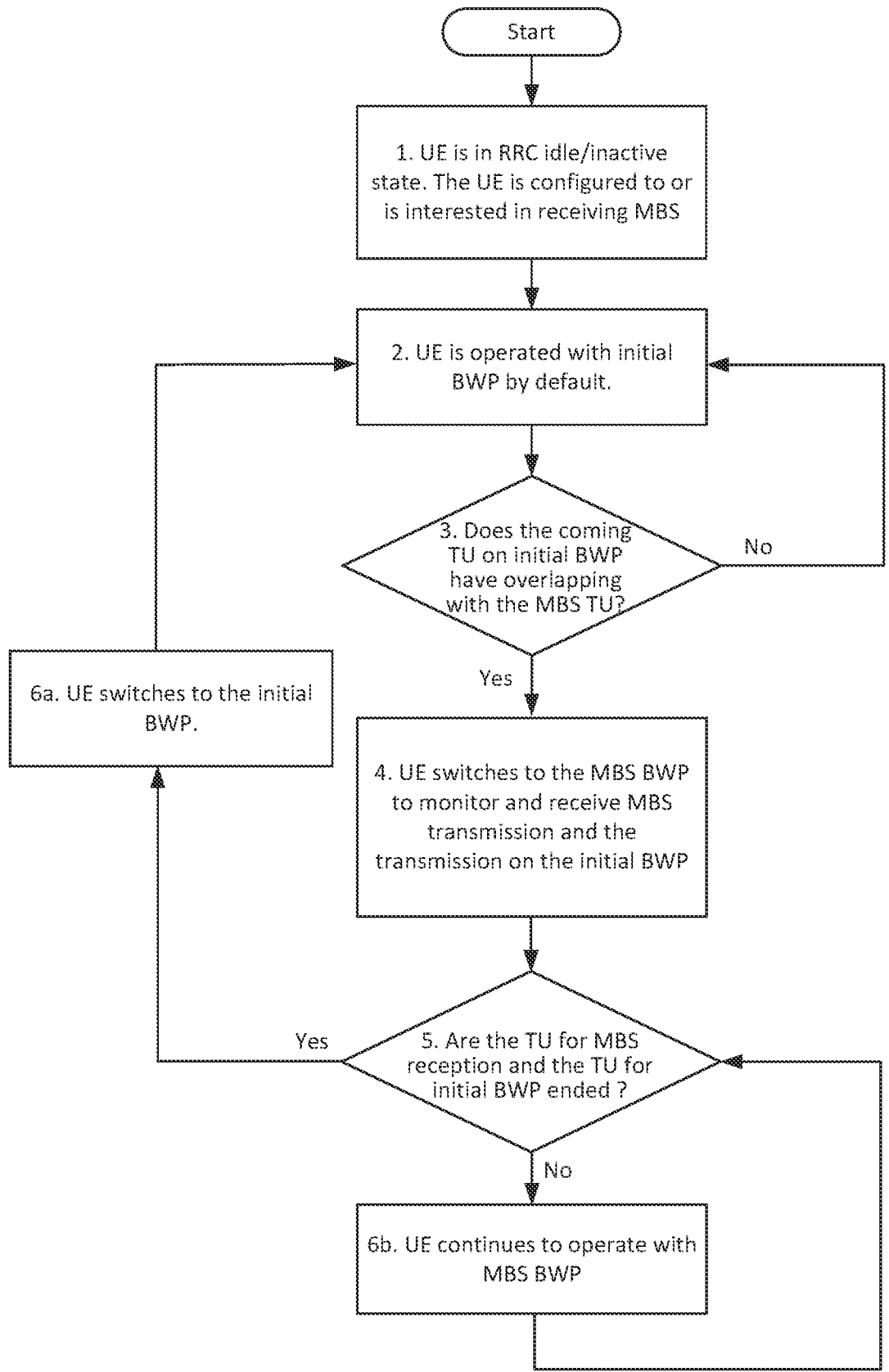
FIG. 7 is a flowchart of an example process for a UE receiving the MBS transmission through the MBS BWP without BWP switching when MBS overlaps with other reception on the initial BWP.

The flowchart in FIG. 7 shows the exemplary steps of a UE receiving the MBS transmission through the MBS BWP without BWP switching when the transmission overlaps with other reception on the initial BWP.

In step 1, a UE is in RRC idle/inactive state. The UE may be configured by the gNB to receive MBS or the UE may be interested in receiving certain MBS provide by the gNB. In this case, the UE may determine the MBS BWP and the TU to be used for monitoring and receiving the MBS from the gNB. The UE may also determine the initial BWP to be used, e.g., initial BWP that is equal to the CORESET #0 configured by MIB or initial BWP configured by the SIB1, where the initial BWP is confined within the MBS BWP in frequency.

In step 2, the UE may operate with the initial BWP by default. For example, the UE may monitor and detect if there is a paging message sent by the gNB or the UE may monitor and detect if there is system information update, etc.

In step 3, the UE may check if the coming TU on initial BWP has overlapping with the TU used for the MBS reception in time. If the check result is no, the UE may continue to operate with the initial BWP and return to step 2.

In step 4, if the check result in step 3 is yes, e.g., the initial BWP TU has overlapping with the MBS TU, regardless whether the initial BWP TU and the MBS TU are fully overlapping or partially overlapping, the UE may perform BWP switching and switch from the initial BWP to the MBS BWP. The UE may monitor and receive the MBS transmission, and may monitor and receive the transmission occurred on the initial BWP using the MBS BWP within the whole configured initial BWP TU. Note in the case, the UE is still operated with one BWP while operating with two sets of BWP-configurations, i.e., configuration for initial BWP and configuration for MBS BWP. For example, the UE may still determine the frequency location for the CORESET transmitted on the initial BWP based on the corresponding CORESET configuration and the initial BWP configuration. The UE may determine the frequency location for the CORESET transmitted on the MBS BWP based on the corresponding CORESET configuration and the MBS BWP configuration.

In step 5, the UE may check if both the current MBS TU and the current initial BWP TU are ended.

In step 6a, if the check result in step 5 is yes, the UE may switch back to the initial BWP and return to the step 2. Or the UE may still remain in the MBS BWP to avoid frequency switching.

In step 6b, if the check result in step 5 is no, the UE may continue to operate with the MBS BWP and return to step 5 to keep checking if both the current MBS TU and the initial BWP TU are ended.

In another approach, when the MBS TU is fully overlapped or partially overlapped with the TUs on the initial BWP, the UE may perform the BWP switching and switch from the initial BWP to the MBS BWP when the UE needs to receive the MBS transmission e.g., when the UE needs to monitor the CORESET and search space for scheduling the MBS transmission, or when the UE needs to receive the PDSCH of the MBS transmission, etc. Otherwise, the UE may operate with the initial BWP.

Figure 8A:
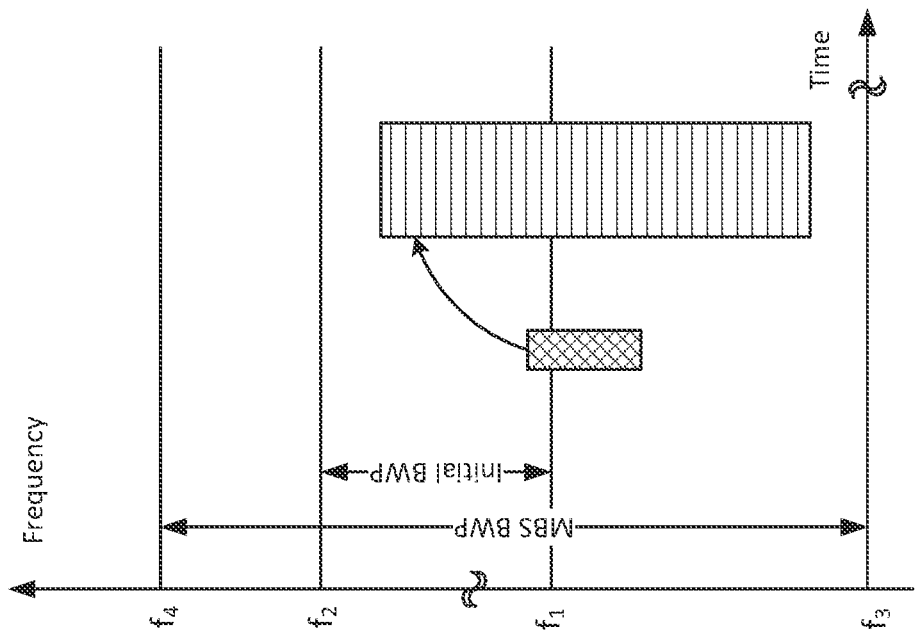
FIG. 8A is a time and frequency diagram of an example of MBS scheduling with scheduling Downlink Control Information (DCI) transmitted in the initial BWP.
Figure 8B:
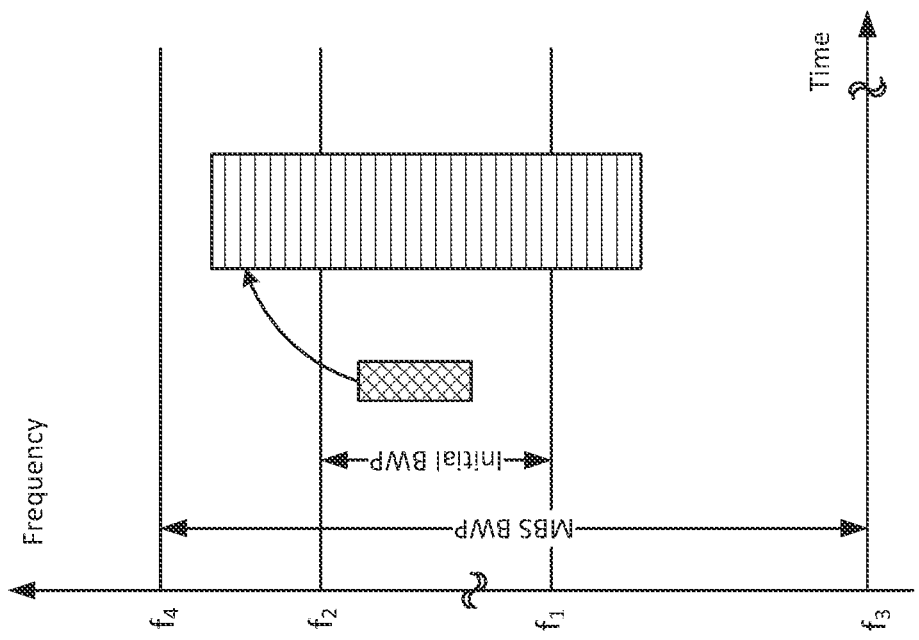
FIG. 8B is a time and frequency diagram of an example of MBS scheduling with scheduling DCI transmitted in the MBS BWP.

In one example, both the DCI scheduling the MBS transmission and the PDSCH of the MBS transmission may be transmitted in the MBS BWP as shown in FIG. 8(B). The UE may switch to the MBS BWP when the monitoring occasion (MO) of the MBS scheduling DCI comes. If the UE detects the scheduling DCI, the UE may stay with the MBS BWP until the PDSCH is received. Then the UE may switch back to the initial BWP. Or, if the UE does not detect the scheduling DCI, the UE may directly switch back to the initial BWP.

In another example, the PDSCH of the MBS transmission may be transmitted in the MBS BWP, while the DCI scheduling the MBS transmission may be transmitted in the initial BWP as shown in FIG. 8(A). In this case, the UE may operate with the initial BWP to receive the transmission in the initial BWP and monitor the DCI scheduling the MBS transmission. If no MBS scheduling DCI is detected, the UE may stay in the initial BWP and no BWP switching is needed. The UE may perform BWP switching to receive the PDSCH of the MBS transmission only when an MBS scheduling DCI is detected. After receiving the PDSCH of the MBS transmission, or its deactivation in case of SPS-PDSCH transmission, the UE may switch back to the initial BWP.

Figure 9:
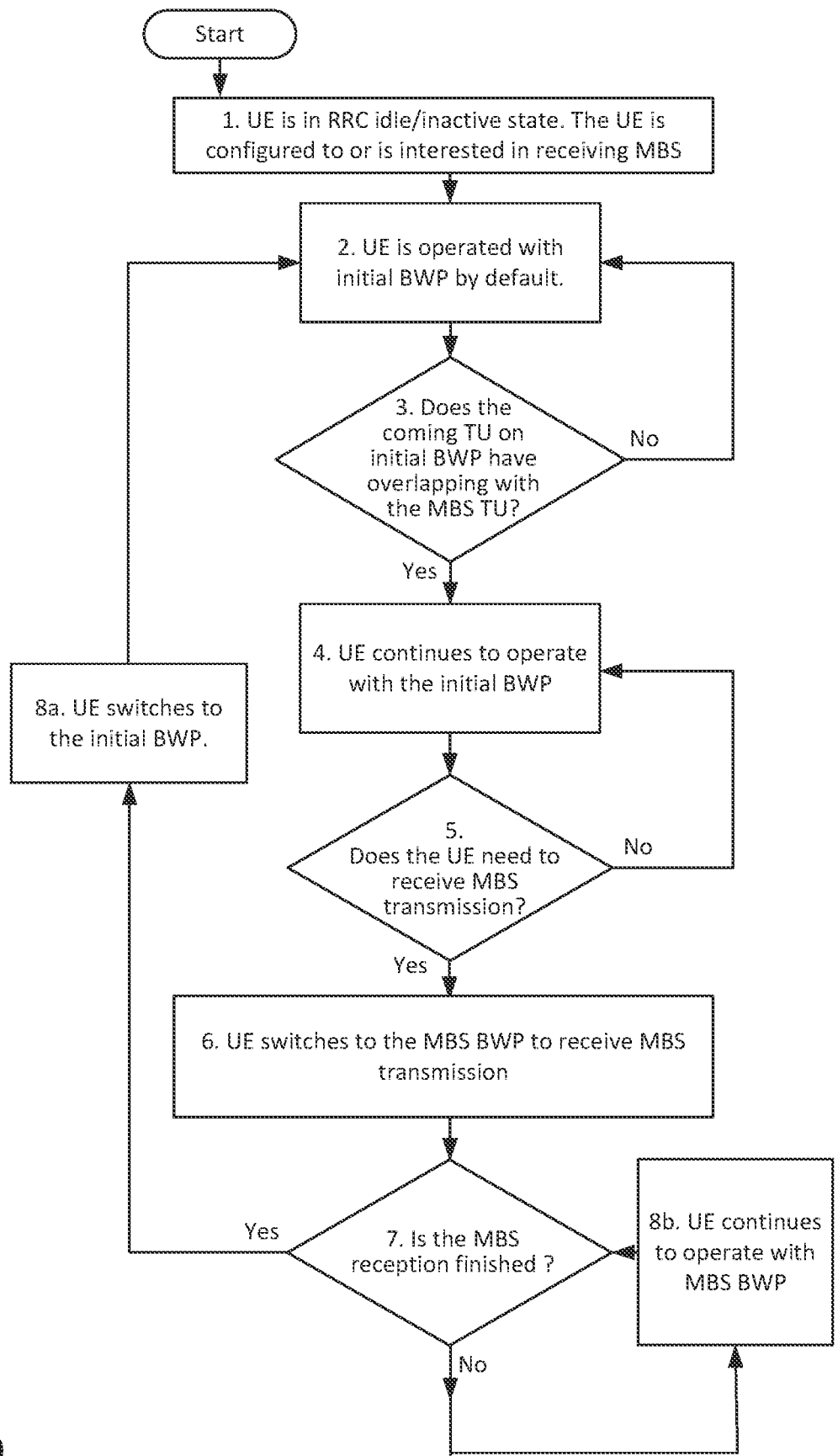
FIG. 9 is a flowchart of an example process for a UE receiving the MBS transmission through the MBS BWP with BWP switching when MBS overlaps with other reception on the initial BWP.

The flowchart in FIG. 9 shows the exemplary steps of a UE receiving the MBS transmission through the MBS BWP with BWP switching when the reception on the MBS BWP is overlapped with the reception on initial BWP.

In step 1, a UE is in RRC idle/inactive state. The UE may be configured by the gNB to receive MBS or the UE may be interested in receiving certain MBS provide by the gNB. In this case, the UE may determine the MBS BWP and the TU to be used for monitoring and receiving the MBS from the gNB. The UE may also determine the initial BWP to be used, where the initial BWP is confined within the MBS BWP in frequency.

In step 2, the UE may operate with the initial BWP by default. For example, the UE may monitor and detect if there is a paging message sent by the gNB or the UE may monitor and detect if there is system information update, etc.

In step 3, the UE may check if the coming TU on initial BWP has overlapping with the TU used for the MBS reception in time. If the check result is no, the UE may continue to operate with the initial BWP and return to step 2.

In step 4, if the check result in step 3 is yes, e.g., the initial BWP TU has overlap with the MBS TU, the UE may stay in the initial BWP. The UE does not switch its BWP to the MBS BWP until the next checking condition is passed.

In step 5, the UE may check if the UE needs to receive MBS transmission. Here the MBS transmission may be an MO of the MBS scheduling DCI, or may be the PDSCH of the MBS transmission, etc. If the check result is no, the UE may continue to stay in the initial BWP and return to the step 4.

In step 6, if the check result in step 5 is yes, the UE may perform BWP switching and switch from the initial BWP to the MBS BWP. The UE may receive the MBS transmission on the MBS BWP. Meanwhile, the UE may also receive the transmission on the initial BWP while the UE is operating with the MBS BWP. Note in the case, the UE is still operated with one BWP while operating with two sets of BWP-configurations, i.e., configuration for initial BWP and configuration for MBS BWP. For example, the UE may still determine the frequency location for the CORESET transmitted on the initial BWP based on the corresponding CORESET configuration and the initial BWP configuration. The UE may determine the frequency location for the CORESET transmitted on the MBS BWP based on the corresponding CORESET configuration and the MBS BWP configuration In step 7, the UE may check if the MBS reception is finished.

In step 8a, if the check result in step 7 is yes, the UE may switch back to the initial BWP and return to the step 2.

In step 8b, if the check result in step 7 is no, the UE may continue to operate with the MBS BWP and return to step 7 to keep checking if the MBS reception is finished.

To help the gNB determine how to configure the MBS frequency band or the MBS BWP, a UE may report its corresponding capability. In one example, the methods to configure the MBS frequency band or the MBS BWP may be categorized into different cases, e.g., categorized into case 1-case 5 based on the bandwidth size that can be configured. The UE may report the case(s) that the UE can support to the gNB. In another example, the UE may report the bandwidth the UE can support in the RRC idle/inactive, e.g., maximum bandwidth, to the gNB. In yet another example, the UE may report the package size, e.g., transport block size, of the MBS the UE can support in the RRC idle/inactive, e.g., maximum package size, to the gNB. Based on the reported UE capability, the gNB may determine how to configure the MBS frequency band or the MBS BWP. In the previous examples, the UE reports explicit capability support (e.g., package size support, maximum bandwidth, etc.). In another example, such capabilities may be reported by the UE implicitly as a type/profile that encapsulates these parameters together with other information and reported to the gNB that can derive the specific UE capabilities.

BWP Configuration for MBS in RRC Idle/Inactive

MBS BWP and the MBS frequency band may be signaled to the UE by the network. For the sake of simplicity, we may use the MBS BWP as an example to illustrate how the configuration is signaled. However, the proposed solutions and schemes in this disclosure can be also applied to signal the configuration of the MBS frequency band, and vice versa.

When a UE is in RRC idle/inactive, the UE may receive the configuration of the MBS BWP, e.g., the dedicated MBS BWP shown in FIG. 2, or the wider MBS BWP shown in FIG. 6, and the configuration of the MBS frequency band shown in FIG. 4 through the broadcast signaling.

In one alternative, anew SIB, e.g., SIB15, may be broadcasted by the network to deliver the MBS related information. The new SIB may contain the configuration of the MBS BWP for the UE to be used in RRC idle/inactive.

In another alternative, the configuration of the MBS BWP may be signaled together with the configuration of the initial BWP using the same signaling, i.e., through the SIB1. For example, the RRC configuration DownlinkConfigCommon-SIB in the SIB1 may carry both the initial BWP configuration and the MBS BWP configuration for the UE to be used in RRC idle/inactive.

In yet another alternative, a new logical channel, e.g., Multicast/Broadcast Service Multicast Control Channel (MBS-MCCH), may be defined in NR to provide the MBS control related information. The MBS-MCCH may be mapped to the DL-SCH. The RRC message class, e.g., MBS-MCCH-Message class which may contains a set of RRC messages may be transmitted on the MBS-MCCH logical channel. The configuration of the MBS BWP may be transmitted on the MBS-MCCH logical channel through the MBS-MCCH-Message, which may be transmitted on the initial BWP.

In yet another alternative, a UE may receive the configuration of the MBS BWP to be used in RRC idle/inactive when the UE is in the RRC connected mode. For example, a UE may receive such configuration when the UE is in RRC connected mode, e.g., through broadcast signaling or through UE dedicated signaling. When the UE transits from the RRC connected state to RRC idle/inactive state, the UE may keep the received MBS BWP configuration and use the received MBS BWP configuration to determine the MBS BWP to be used in the RRC idle/inactive.

In yet another alternative, the configuration of the MBS BWP may be configured via RRCRelease message when the UE transits from RRC connected mode to RRC idle/inactive mode.

In one approach, one MBS BWP or one MBS frequency band may be configured per cell for all the MBS transmissions. Or, in another approach, one MBS BWP or one MBS frequency band may be configured per multicast/broadcast service. For example, Each MBS service identified by a Temporary Mobile Group Identity (TMGI), or identified by other identities, e.g., G-RNTI, may be associated with a BWP via the configuration. Alternatively, multiple MBS services may be organized into groups or sub-groups wherein each group or subgroup is associated with a TMGI, or a G-RNTI, etc., wherein the TMGI or G-RNTI may be explicitly configured into the UE in association with a BWP. The BWP may be the initial BWP or a dedicated BWP that is different from the initial BWP. Or the association may be implicitly determined. For example, certain TMGIs or G-RNTIs are associated with one BWP and other TMGIs or G-RNTIs are associated with another BWP, e.g., based on the value range of the TMGI or G-RNTI, or based on whether the TMGI or G-RNTI is even or odd, etc.

The UE may use the association between TMGI and BWP, and the UE MBS service interest or the MBS service the UE is receiving to decide on whether to perform BWP switching. For example, for a low data rate MBS service TMGI, the UE may use the initial BWP for MBS reception, while for a medium to high date rate service TMGI, the UE may know the initial BWP will not be adequate and may switch to a BWP associated with the TMGI of the higher data rate MBS service.

The association between service or service group and the TMGI or G-RNTI may be configured into the UE through RRC common signaling such as system information broadcast or through a dedicated RRC signaling such as RRC connection release or RRC Connection Reconfiguration message.

Configuration of Dedicated MBS BWP

When a UE is operating with the dedicated MBS BWP, we disclose that the gNB may configure the bandwidth and the starting point of the MBS BWP to the UE. In one example, the bandwidth and the starting point may be separately configured. For example, the bandwidth may be indicated by the number of PRBs that the MBS BWP occupied. The starting point may indicate the frequency offset, e.g., in unit of PRB, with respect to the PRB 0. Or the starting point may indicate the frequency offset with respect to the PRB with the lowest PRB index, or with the highest PRB index within the initial BWP used in the RRC idle/inactive.

In another example, the bandwidth and the starting point may be jointly configured. For example, RRC parameter locationAndBandwidth may be used, where each value is associated with one combination of the bandwidth value and the starting point value that can be predetermined by the UE based on other information configured by the gNB or may be predefined in the spec.

Configuration of Narrower MBS Frequency Band

When a UE is operating with the MBS frequency band which is confined within the initial BWP, we disclose the following alternatives may be applied to configure the MBS frequency band.

In a first alternative, the solution disclosed for configuring dedicated MBS BWP may be used. For example, the UE may be configured with the bandwidth and the starting point of the MBS frequency band. Besides the approaches that has been already disclosed above, the bandwidth may be indicated as $$\frac{1}{k}$$

the initial BWP bandwidth, where k may be configured by the network. For example, if a UE is configured with the initial BWP bandwidth with 10 MHz and is configured with k=2, the UE may determine that the bandwidth of the MBS frequency band is 5 MHz.

In a second alternative, the initial BWP may be evenly divided into l portions in frequency. The MBS frequency band may be configured as one out of or multiple out of the l portions. The value of l may be predefined or configured by the network. For example, a bitmap may indicate which portions of the initial BWP should be used as MBS BWP, where the bit width of this field is equal to the number of portions.

In a third alternative, the location of the MBS frequency band may be implicitly determined. Assume that the initial BWP spans $[f_1, f_2]$ and the MBS frequency band spans $[f_3, f_4]$. For example, the MBS frequency band may have the same center frequency as the initial BWP, i.e., $$\frac{f_1 + f_2}{2} = \frac{f_3 + f_4}{2}.$$

Or the MBS frequency band and the initial BWP may have the same highest PRB or lowest PRB, i.e., $f_2=f_4$ or $f_1=f_3$ respectively. In this case, the UE only need to be configured with the bandwidth e.g., through RRC parameter MBS_FB_Bandwidth of the MBS frequency band and the UE can determine the MBS frequency band to be used for RRC idle/inactive.

The MBS_FB_Bandwidth may be configured in unit of PRB or may be configured in unit of the configured bandwidth of the initial BWP. For example, the UE may be configured with value k to indicate that the bandwidth of the MBS frequency band is $$\frac{1}{k}$$

of the initial BWP bandwidth. Or the UE may be also directly configured with the value $$\frac{1}{k}$$

to indicate that the bandwidth of the MBS frequency band is $$\frac{1}{k}$$

of the initial BWP bandwidth.

Or the UE may be configured with the bandwidth difference between the MBS BWP and the initial BWP on one side for the case when they have the same center frequency, e.g., indicated with the value of $f_2-f_4$ through RRC parameter MBS_FB_BandwidthOffset. When they have the same highest PRB or lowest PRB, the UE may be configured with the bandwidth difference to determine the MBS frequency band to be used in RRC idle/inactive as well.

The MBS_FB_BandwidthOffset may be also configured in unit of PRB or may be configured in unit of the configured bandwidth of the initial BWP. The examples disclosed for configuring the value for MBS_FB_Bandwidth may be also applied for configuring the value for MBS_FB_BandwidthOffset.

In a fourth alternative, MBS frequency band may be implicitly determined by other configurations. For example, the UE may be configured with the CORESET for the MBS reception. The MBS frequency band may be the same as the configured CORESET or may be the union of the CORESETs' bandwidths if the UE is configured with multiple CORESETs for monitoring MBS. Therefore, no dedicated configuration for MBS frequency band is needed.

Configuration of Wider MBS BWP

When a UE is operating with the wider MBS BWP, where the entire initial BWP is located within the MBS BWP, we propose that the following methods may be applied to configure the MBS BWP.

Assume that the initial BWP spans $[f_1, f_2]$ and the MBS BWP spans $[f_3, f_4]$. In a first method, the MBS BWP and the initial BWP may have the same lowest PRB, i.e., $f_1=f_3$. In this case, the UE only need to know the bandwidth of the MBS BWP. The UE may be indicated with the bandwidth of the MBS BWP, e.g., indicated with the value of $f_4-f_3$ through RRC parameter MBS_BWP_Bandwidth.

Or the UE may be indicated with the bandwidth difference between the MBS BWP and the initial BWP, e.g., indicated with the value of $f_4-f_2$ through RRC parameter MBS_BWP_BandwidthOffsetTop.

The value of the $f_4-f_3$ and the value of $f_4-f_2$ may be indicated in unit of PRB or may be indicated in unit of the configured bandwidth of the initial BWP. Then the UE may determine the MBS BWP based on the configuration of the initial BWP and the configured $f_4-f_2$ value or based on the configured $f_4-f_3$.

Or the MBS BWP and the initial BWP may have the same highest PRB, i.e., $f_2=f_4$. Then the UE may be configured with the value of $f_4-f_3$ through RRC parameter MBS_BWP_Bandwidth or be configured with the value of $f_3-f_1$ through RRC parameter MBS_BWP_BandwidthOffsetBottom to determine the MBS BWP with the same approach as disclosed above.

In a second alternative, the MBS BWP and the initial BWP may have the same center frequency, i.e.

$$\frac{f_1+f_2}{2} = \frac{f_3+f_4}{2}.$$

In this case, to determine the MBS BWP, the UE may be indicated with the bandwidth of the MBS BWP, e.g., indicated with the value of $f_4-f_3$ through RRC parameter MBS_BWP_Bandwidth. Or the UE may be indicated with the bandwidth difference on one side, e.g., indicated with the value of $f_4-f_2$ through RRC parameter MBS_BWP_BandwidthOffset. The value of the $f_4-f_3$ and the value of $f_4-f_2$ may be indicated in unit of PRB or may be indicated in unit of the configured bandwidth of the initial BWP. Then the UE may determine the MBS BWP based on the configuration of the initial BWP and the configured $f_4-f_2$ value or based on the configured $f_4-f_3$.

In a third alternative, there may be no restrictions on the configured the MBS BWP and the configured initial BWP. The UE may be configured with the bandwidth and the starting point of the MBS BWP to determine the MBS BWP to be used. The bandwidth may be indicated in unit of the PRB or in unit of the configured bandwidth of the initial BWP. The ideas disclosed for configuring the starting point for the dedicated MBS BWP may be also applied here.

Or the UE may be configured with the bandwidth difference between the MBS BWP and the initial BWP on both sides. For example, the UE may be indicated with the value of $f_4-f_2$ through RRC parameter MBS_BWP_BandwidthOffsetTop and indicated with the value $f_1-f_3$ through RRC parameter MBS_BWP_BandwidthOffsetBottom. The bandwidth difference may be indicated in unit of PRB or may be indicated in unit of the configured bandwidth of the initial BWP. Then the UE may determine the MBS BWP based on the configuration of the initial BWP, the configured $f_4-f_2$ value, and the configured $f_1-f_3$.

In a fourth alternative, the MBS BWP may be implicitly determined by other configurations. For example, the UE may be configured with the CORESET for the MBS reception. The MBS BWP may be the same as the configured CORESET or may be the union of the CORESETs' bandwidths if the UE is configured with multiple CORESETs for monitoring MBS. Therefore, no dedicated configuration is needed.

Scheduling for MBS in RRC Idle/Inactive

Dynamic Scheduling

In order to let the UE know when and where to blindly detect the scheduling DCI for the PDSCH transmission, CORESET and search space are introduced in NR. For MBS in RRC idle/inactive, the UE also need to know the CORESET(s) and search space(s) information for the MBS scheduling DCI.

To schedule the PDSCH of the MBS transmission, a new DCI formats, e.g., DCI format 4_0, or DCI format 4_1, etc. may be introduced. DCI format 4_0 may be used for the fallback cases, and DCI format 4_1 may be used for the normal MBS scheduling. The MBS scheduling DCI with DCI format 4_0 and DCI format 41 may be transmitted with CRC scrambled by G-RNTI, where the G-RNTI is the RNTI associated with the multicast/broadcast services. Or may be scrambled by the CS-G-RNTI used for SPS MBS PDSCH.

One G-RNTI may be assigned for all the multicast/broadcast services within a cell. Or each multicast/broadcast service may be allocated with a dedicated G-RNTI and a UE may be configured with multiple G-RNTIs in one cell. Same solutions can be applied for CS-G-RNTI.

In a first alternative, the CORESET and the search space for MBS scheduling DCI may reuse the CORESET 0 and the search space 0 configured by the gNB. For example, a UE may determine the configured CORESET 0 and the search space 0 information through the Master Information Block (MIB) or RMSI. The UE may monitor and blindly detect MBS scheduling DCI e.g., DCI format 4_0, DCI format 41, in the configured CORESET 0 and the search space 0 to determine if there is MBS transmission scheduled.

This alternative may be applied to the case that MBS scheduling DCI is transmitted in the initial BWP and the PDSCH of the MBS transmission is transmitted in the MBS BWP or MBS frequency band. In this case, the UE may determine the resource allocation in the DCI with respect to the MBS BWP or MBS frequency band. For example, the bit size of the frequency domain resource assignment (FDRA) field in the DCI may be determined by the $$N_{RB}^{MBS,BWP}, \text{ where } N_{RB}^{MBS,BWP}$$

is the size of the MBS BWP or MBS frequency band. The UE may determine the allocated frequency resources with respect to the PRB 0 in the MBS BWP or MBS frequency band rather than the PRB 0 in the initial BWP.

On the other hand, this alternative may be applied to the case that both the MBS scheduling DCI and the PDSCH of the MBS transmission are transmitted in the same MBS BWP or the same MBS frequency band.

In a second alternative, a UE may reuse the CORESET and the search space configured for paging by the gNB for MBS. For example, a UE may use the RRC parameter pagingSearchSpace to determine the search space and the associated CORESET configured for paging and use the determined search space and the associated CORESET configured for paging to monitor and blindly detect MBS scheduling DCI.

Similar to the first alternative, this alternative may be applied to the case that MBS scheduling DCI is transmitted in the initial BWP and the PDSCH of the MBS transmission is transmitted in the MBS BWP or MBS frequency band and may be applied to the case that both the MBS scheduling DCI and the PDSCH of the MBS transmission are transmitted in the same MBS BWP or the same MBS frequency band. The ideas on determining the resource allocation disclosed for the first alternative may be also applied here.

When the paging CORESET and search space are reused, in one approach, the MBS transmission may be scheduled by the DCI with CRC scrambled by G-RNTI, e.g., through DCI format 4_0, or DCI format 4_1, etc. In this approach, the UE needs to monitor the DCI format used for MBS to receive the scheduling. Meanwhile, the UE also needs to monitor the paging DCI used for scheduling the short message transmission or used for scheduling the paging message transmission.

In another approach, the MBS transmission may be scheduled by the paging DCI e.g., through DCI format 1_0 with CRC scrambled by P-RNTI. Or may be scheduled by the DCI scheduling system information which is scrambled with SI-RNTI and transmitted in OSI search space. When transmitting the MBS scheduling, the size of the paging DCI keeps the same. In this approach, the UE does not need to monitor a dedicated DCI format used for MBS. Instead, the UE only needs to monitor the paging DCI, which can help the UE to reduce the blind decoding complexity therefore can help the UE to save power. When paging DCI is reused, the UE may also reuse other paging related properties such as DRX, PF, PO, etc. Or, alternatively, separate paging occasion(s) may be allocated for MBS purposes.

Since the paging DCI is used for other purposes, e.g., schedule the short message transmission, schedule the paging message transmission, etc., mechanisms need to be introduced for the UE to distinguish when the paging DCI is used for scheduling the MBS.

In one scheme, the Short Messages Indicator field in the paging DCI may be used to indicate such information. In current design, 2 bits are allocated for the ShortMessages Indicator field with one codepoint '00' is reserved. We disclose this reserved codepoint may be used to indicate the corresponding paging DCI is used for scheduling the MBS transmission as the example shown in Table 1 of the Appendix. When a UE receives a paging DCI with Short Messages Indicator field set to '00', the UE may determine the received DCI is used for scheduling MBS.

In another scheme, the ShortMessages field in the paging DCI may be used. This scheme may be applied when the reserved codepoint in ShortMessages Indicator field is used for other purpose. In current design, 8 bits bitmap is allocated for the Short Messages field, where bits 4-8 are unused. We disclose that one of these unused bits may be used to indicate the corresponding paging DCI is used for scheduling the MBS transmission.

An example of bit 4 is used to indicate such information is shown in Table 2 of the Appendix. When a UE receives a paging DCI with ShortMessages field with the bit 4 set to '1', the UE may determine the received DCI is used for scheduling MBS.

In a third alternative, a UE may be configured with dedicated CORESET and search space for scheduling the MBS transmission. The configuration of CORESET may be with respect to the MBS BWP or MBS frequency band. Or configuration of CORESET may be with respect to the initial BWP. A new common search space (CSS) with new PDCCH type, e.g., Type4-PDCCH, or a new group search space (GSS) may be introduced to configure the search space for MBS.

In one approach, the CORESET and search space may be cell-specifically configured, e.g., the same CORSET and search space are configured for all the multicast/broadcast services within one cell. Or the CORESET and search space may be configured per multicast/broadcast service, e.g., each multicast/broadcast service may be configured with dedicated CORESET and search space.

The broadcast signaling proposed to signal the MBS BWP information may be also applied to configure the CORESET and search space information to the UE. For example, a new SIB 15 may be used; or the new logical channel MBS-MCCH may be used; or SIB 1 may be used. Besides receiving such information in RRC idle/inactive through broadcast signaling, a UE may receive/obtain the CORESET and search space information when the UE is in RRC connected mode as disclosed for MBS BWP.

For the case that a dedicated CORESET and search space is used and the case that reusing the paging search space, a fallback mechanism may be introduced in addition. For example, when the UE is explicitly configured with the dedicated CORESET and search space, or the paging search space, the UE may use the configured ones to monitor the DCI. When the UE is not configured with such information, the UE may reuse the CORESET 0 and the search space 0 to monitor the DCI.

Figure 10:
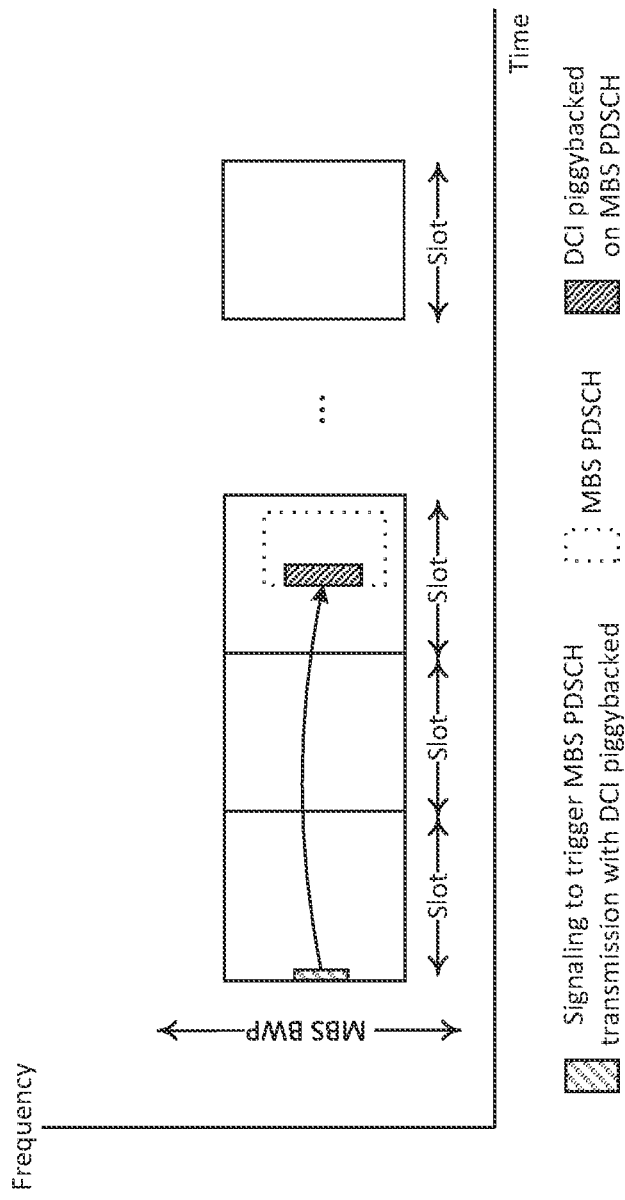
FIG. 10 is a time and frequency diagram of an example of MBS transmission with DCI piggybacked on PDSCH.

In a fourth alternative, the MBS scheduling DCI may be piggyback on the MBS PDSCH as shown in FIG. 10.

We disclose that a triggering signal or channel may be introduced to trigger the DCI piggybacking. For example, the triggering signal may be a reference signal, e.g., CSI-RS, TRS, DMRS, etc. Or the triggering channel may a PDCCH carrying a DCI with compact size. The triggering signal or channel may be periodically transmitted or semi-persistently transmitted which may be configured by the network.

When a UE detects the triggering signal, the UE may determine the PDSCH carrying MBS data with piggybacked DCI on the PDSCH will be transmitted, and the UE may determine the time and frequency resource allocation for the PDSCH. Once the UE receives the PDSCH transmission, the UE may first decode the piggybacked DCI to achieve the additional scheduling information, e.g., MCS, HARQ related information, PUCCH resource indication, transmission power control (TPC) for PUCCH, etc. Then the UE may decode the PDSCH to receive the MBS transmission.

This approach can reduce the DCI blind decoding effort since the UE knows the DCI is piggybacked in the PDSCH and how the DCI is piggybacked, e.g., mapping rules, how many resources are occupied, etc. As a result, using this approach may help the UE to reduce the power consumption in receiving the MBS in RRC idle/inactive.

Downlink Scheduling without Dynamic Grant

Besides dynamically scheduled by the gNB, the transmission of the MBS PDSCH for the UEs in RRC idle/inactive state may be scheduled without dynamic grant, e.g., the resources used for the MBS PDSCH transmission in RRC idle/inactive may be pre-configured. For example, scheduling without dynamic grant may be used for the broadcast service, e.g., the gNB/TRP may periodically broadcast the advertisements to the customers in the shopping mall using the pre-configured resources. Or, in another example, scheduling without dynamic grant may be also used for the multicast services, where the PDSCH is delivered to a certain group of UEs.

Configured Scheduling

In one alternative, the MBS PDSCH transmission in RRC idle/inactive may be configured by the RRC signaling, e.g., by a BWP configuration for MBS in RRC idle/inactive. For example, once a UE determines the pre-configured resources, the UE may monitor and receive the associated MBS PDSCH transmission when the UE is in the RRC idle/inactive state. In this disclosure, we denote this method of scheduling as configured scheduling (CS).

Figure 13:
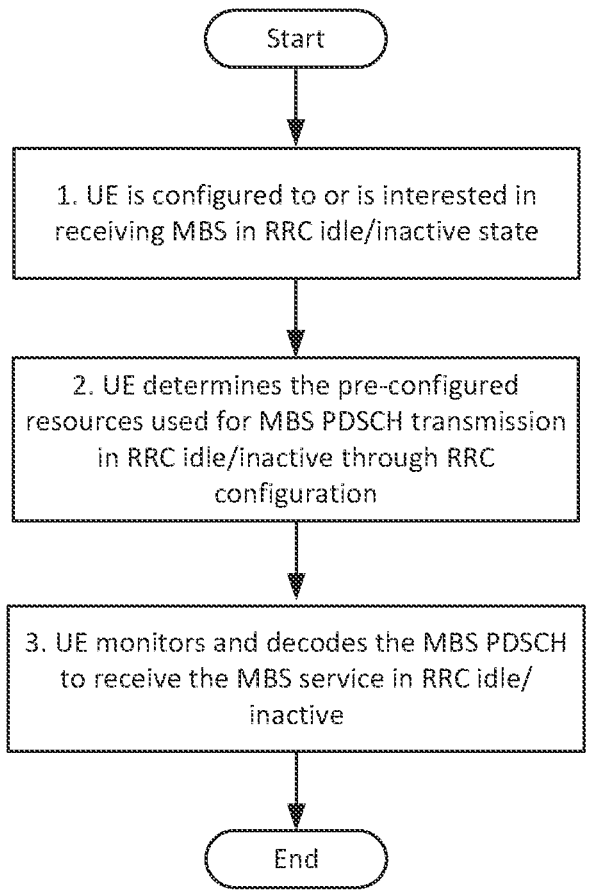
FIG. 13 is a flowchart of an example process for a UE receiving an MBS transmission in RRC idle/inactive using configured scheduling.

The flowchart in FIG. 13 shows the exemplary steps of a UE receiving MBS transmission in RRC idle/inactive using configured scheduling.

In step 1, a UE may be configured by the gNB to receive MBS in RRC idle/inactive state. Alternatively, the UE may be indicated by higher layers, e.g., application layer, to receive certain MBS provided by the gNB in RRC idle/inactive state.

In step 2, the UE may be configured by the gNB through RRC signaling with the resources used for configured scheduling PDSCH transmission in RRC idle/inactive state. Once the gNB sends out RRC signaling, the gNB may directly initiate the MBS PDSCH transmission using the indicated resources, or the gNB may initiate the transmission at the time when the RRC configuration is applicable.

The RRC signaling configuring the resources may contain one or more of the following ten example items of information:

First is periodicity for the configured scheduling. The periodicity may be configured by the gNB in unit of symbol, or in unit of slot, or in unit of ms, or in unit of subframes, or in unit of frames, etc. After a UE determines the $1^{st}$ DL transmission of the configured scheduling, the UE may expect the following $n^{th}$ DL transmission for the same configured scheduling to be transmitted n×Periodicity symbols or slots or ms after the $1^{st}$ transmission.

Second is an index of the configured scheduling configuration, e.g., MBS-cs-ConfigIndex, which configures the unique identity of an configured scheduling configuration among all of the configured scheduling configurations within the BWP of the serving cell.

Third is an aggregation factor. A UE may be configured by the gNB with the number of repetitions for the configured scheduling PDSCH transmission.

Fourth is an MCS value. A UE may be configured by the gNB with the modulation and coding scheme used for the configured scheduling PDSCH transmission.

Fifth is a time domain resource allocation. For example, a UE may be configured with the starting symbol within a slot and the symbol duration, e.g., number of symbols, of the configured scheduling PDSCH.

Sixth is a time domain offset. A UE may be configured with the time domain offset to determine the slot carrying the configured scheduling PDSCH. For example, a UE may be configured with the slot offset and/or frame offset. The UE may determine the slot carrying the configured scheduling PDSCH using the configured slot offset and/or frame offset with respect to a reference point. The reference point may be the frame with system frame number (SFN)=0. Or the reference point may be a reference SFN configured by the gNB.

Seventh is a frequency domain resource allocation. For example, a UE may be configured with the starting PRB and length of the PRB to indicate the frequency domain resource allocation for the configured scheduling PDSCH.

Eighth is a DMRS configuration. A UE may be configured with the configuration of the DMRS used for the configured scheduling PDSCH.

Ninths is a DMRS sequence initializer. A UE may be configured with the sequence initializer used to calculate the DMRS sequence for the configured scheduling PDSCH.

Tenth is spatial information or QCL information. For example, a UE may be configured with the QCL assumption used to receive the configured scheduling PDSCH. The UE may be configured with a source reference signal, e.g., SSB or CSI-RS, etc., where the UE can assume that the DMRS of the configured scheduling PDSCH is QCL-ed, e.g., QCL type D or QCL type A, etc., with the configured source reference signal. Or the UE may be configured with an index of the transmission configuration indication to indicate the QCL information of the configured scheduling PDSCH.

A UE may receive the RRC configuration of the configured scheduling PDSCH through one of or a combination of the following four example methods.

First, a UE may be configured with the configuration of the configured scheduling PDSCH in RRC connected state, e.g., through broadcasted RRC signaling or through UE specific RRC signaling. When the UE transits to RRC idle/inactive, the UE may maintain the configured information and used them to determine the resources for configured scheduling PDSCH.

Second, the configuration of the configured scheduling PDSCH may be configured via RRCRelease message when the UE transits from RRC connected state to RRC idle/inactive state.

Third, a UE may be configured with the configuration of the configured scheduling PDSCH in RRC idle/inactive state. The UE may receive the RRC configuration through the broadcast signaling. For example, anew SIB, e.g., SIB16, may be broadcasted by the network to deliver the configured scheduling related information. Or the configuration may be signaled through one of the existing RRC signaling, e.g., through the SIB1. Or, the configuration may be signaled through a new logical channel, e.g., MBS-MCCH as disclosed in this disclosure.

Fourth, a UE may receive the configuration and the reconfiguration message through the ongoing MBS SPS transmission in RRC idle/inactive. E.g., the UE may receive the configuration and the reconfiguration through th MBS SPS PDSCH.

In step 3, once the UE determines the resources and the UE is in RRC idle/inactive state, the UE shall receive and decode the MBS PDSCH to receive the multicast service or the broadcast service in the allocated resources.

To further update the configured scheduling, a reconfiguration of the RRC signaling may be sent to the UE. Once receiving the RRC reconfiguration, the UE uses the updated information to monitor and decode the configured scheduling PDSCH.

Semi-Persistent Scheduling

In another alternative, the MBS PDSCH transmission in RRC idle/inactive may be configured by the RRC signaling and further activated and deactivated, e.g., activated/deactivated by a DCI or MAC-CE. For example, once a UE determines the pre-configured resources and the UE receives the signal that activates that PDSCH transmission, the UE may monitor and receive the associated MBS PDSCH transmission when the UE is in RRC idle/inactive state. In this disclosure, we denote this method of scheduling as semi-persistent scheduling (SPS).

Figure 14:
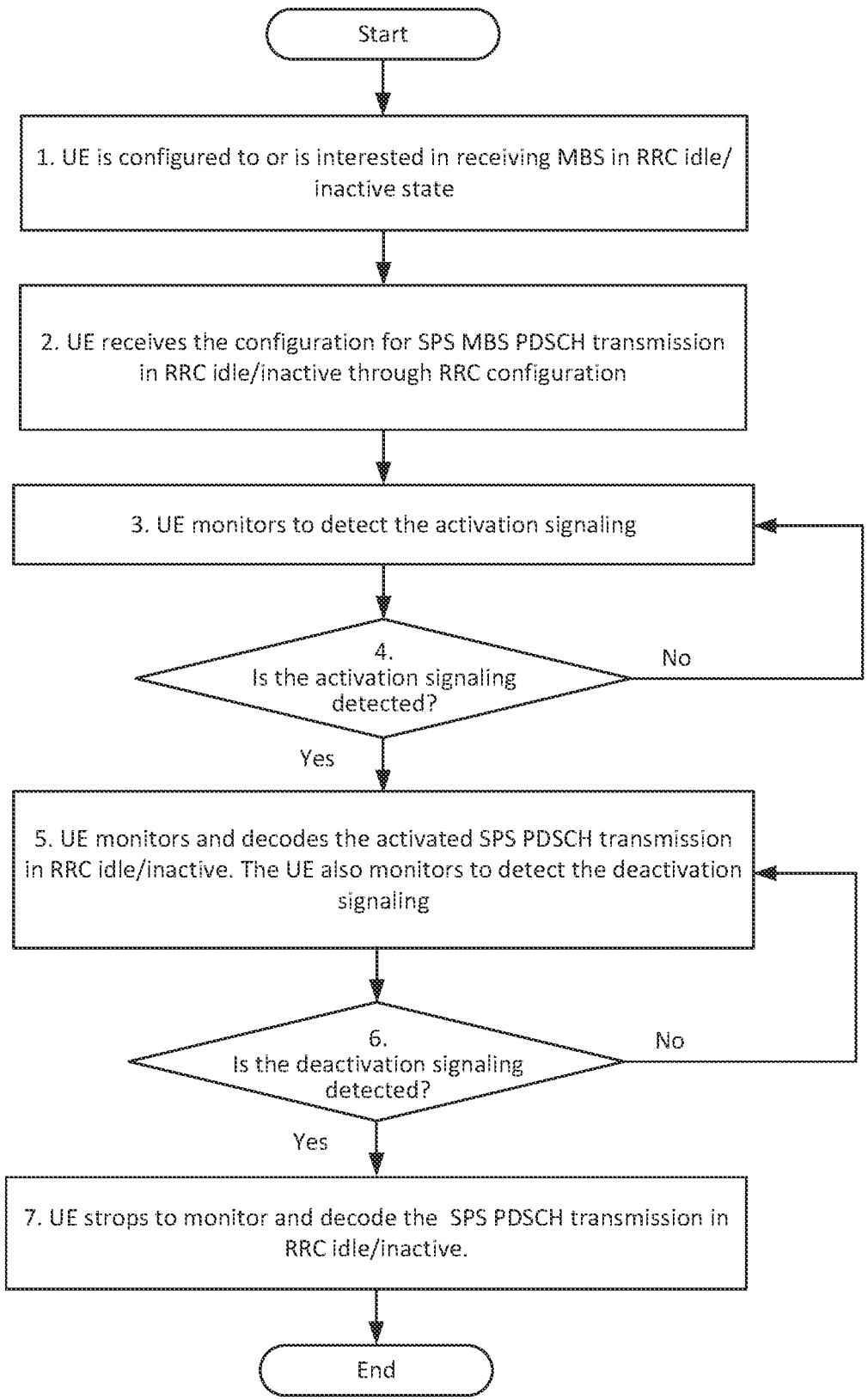
FIG. 14 is a flowchart of an example process for a UE receiving an MBS transmission in RRC idle/inactive using semi-persistent scheduling.

The flowchart in FIG. 14 shows the exemplary steps of a UE receiving MBS transmission in RRC idle/inactive using semi-persistent scheduling.

In step 1, a UE may be configured by the gNB to receive MBS in RRC idle/inactive state. Alternatively, the UE may be indicated by higher layers, e.g., application layer, to receive certain MBS provided by the gNB in RRC idle/inactive state.

In step 2, the UE may be configured by the gNB through RRC signaling with the information used for MBS SPS PDSCH transmission in RRC idle/inactive state.

The information may contain one or more of the periodicity for the SPS scheduling, index of the configured scheduling configuration, aggregation factor, MCS value, time domain resource allocation, time domain offset, frequency domain resource allocation, DMRS configuration, DMRS sequence initializer, spatial information, etc. The detailed design of the above information disclosed for configured scheduling may be also applied here for SPS.

A UE may receive the RRC configuration for SPS in RRC idle/inactive when the UE is in RRC connected state, or in RRC idle/inactive state, or when the UE performs the state transition. The detailed design of RRC signaling disclosed for configured scheduling may be also applied here for SPS.

In step 3, the UE may monitor and detect the activation signaling.

In a first example, the activation signaling may only serve the function of activating an MBS SPS transmission in RRC idle/inactive. In this case, the activation signaling may be a reference signal e.g., CSI-RS, or TRS, etc. Or the activation signaling may be a downlink control signaling, e.g., a group common DCI or a UE specific DCI or in a CSS (e.g., DCI 1_0). The DCI may be transmitted through a group common PDCCH or may be transmitted through a PDCCH that is dedicated to the UE.

In a second example, besides the activation function, the activation signaling may also serve some additional functions, e.g., the activation signaling may also carry some of the scheduling information. Some of the information disclosed to be carried by the RRC signaling in step 2 may be carried by the activation signaling, e.g., the activation signaling may carry one or more of the information of MCS value, time domain resource allocation, time domain offset, frequency domain resource allocation, DMRS configuration, DMRS sequence initializer, spatial information, etc. In this case, the activation signaling may be a downlink control signaling, e.g., a group common DCI or a UE specific DCI, which is transmitted through a group common PDCCH or dedicated PDCCH. Or the activation signaling may be a reference signal e.g., CSI-RS, or TRS, PRS, etc., where the reference signal may carry a few bits of information e.g., by the selection of one out a multiple candidate sequences. Or the activation signaling may be the combination of an RS and DL control signaling, e.g., an RS followed by DL control signaling. The reference signal may be a wake-up signal that helps the UE to save power. Once the UE detects the wake-up signal, the UE further detects the downlink control signaling to determine the scheduling information carried by downlink control signaling.

A UE may monitor and detect the activation signaling in RRC idle/inactive state. For example, when a UE is in RRC idle/inactive state, the UE monitors and detects the activation signaling. Once the activation signaling is detected, the UE starts to receive the activated MBS SPS PDSCH transmission. Or a UE may receive the activation signaling in RRC connected state or when the UE transits from RRC connected state to RRC idle/inactive state. After the UE transits to RRC idle/inactive state, the UE may directly start to receive the activated MBS SPS PDSCH transmission without the need of further detecting an additional activation signaling.

When a downlink control signaling is used as the activation signaling, a new DCI formats, e.g., DCI format 4_0, or DCI format 4_1, etc. may be introduced. Or the activation signaling may reused one of the existing DCI, e.g., reuse the paging DCI. By reusing the paging DCI, the UE does not need to monitor a dedicated DCI format used for MBS. Instead, the UE only needs to monitor the paging DCI, which can help the UE to reduce the blind decoding complexity therefore can help the UE to save power. When paging DCI is reused, the UE may also reuse other paging related properties such as DRX, PF, PO, etc. Or, alternatively, separate paging occasion(s) may be allocated for MBS purposes.

Since the paging DCI is used for other purposes, e.g., schedule the short message transmission, schedule the paging message transmission, etc., mechanisms need to be introduced for the UE to distinguish when the paging DCI is used for activating the MBS SPS. Similar to dynamic scheduling, the Short Messages Indicator field in the paging DCI may be used to indicate such information, an example is shown in Table 3 of the Appendix.

Or the ShortMessages field in the paging DCI may be used to indicate such information, an example is shown in Table 4 of the Appendix.

The example only shows the exemplary bit indicating the paging DCI is used for activating the SPS. This example may be also combined with other embodiments disclosed in this application. For example, bit 4 may be used for indicating the paging DCI is used for dynamically scheduling MBS transmission, bit 5 may be used for indicating the paging DCI is used for activating the SPS, bit 6 may be used for indicating the paging DCI is used for deactivating the SPS, etc. Or multiple bits may be used to indicate the SPS configuration index(es) when multiple MBS SPS configurations that could be activated. Or the activation and the deactivation may share the same bit. For example, bit 5 may be used for indicating such information. E.g., setting bit 5 to 1 is used for indicating the paging DCI is used for activating the SPS; setting bit 5 to 0 is used for indicating the paging DCI is used for deactivating the SPS.

In a first example, the CORESET and the search space for the activation DCI may reuse the CORESET 0 and the type 0 search space configured by the gNB. E.g., the UE monitors the CORESET 0 and the search space 0 to detect the activation downlink control signaling for SPS. Or, in a second example, the CORESET and search space configured for paging DCI may be reused. E.g., the UE monitors the CORESET and the search space configured for paging DCI to detect the activation downlink control signaling for SPS. Or, in a third example, a UE may be configured with dedicated CORESET and search space for the activation downlink control signaling for SPS. The embodiments disclosed on the design of CORESET and search space for dynamic scheduling may be also applied here for the activation downlink control signaling.

In one approach, the CORESET and search space may be cell-specifically configured, e.g., the same CORESET and search space are configured for all the SPS PDSCH configurations within one cell. Or the CORESET and search space may be configured per SPS PDSCH configuration, e.g., each SPS PDSCH configuration may be configured with dedicated CORESET and search space.

In step 4, the UE may check if an activation signaling is detected. If so, the UE proceeds to step 5. If not, the UE continues to monitor and check if an activation signaling is detected.

In step 5, the UE receives the MBS PDSCH transmission on the allocated resource in RRC idle/inactive state. Meanwhile the UE may monitor and detect the deactivation signaling. The UE may assume that the SPS PDSCH will be transmitted until the UE detects the deactivation signaling. The embodiments disclosed in step 3 for the design of the activation signaling, e.g., signaling details, DCI design, CORESET and search space design, etc., may be also applied here for the deactivation signaling.

In step 6, the UE may check if a deactivation signaling is detected. If so, the UE proceeds to step 7. If not, the UE continues to monitor and check if a deactivation signaling is detected.

In step 7, after the deactivation signaling is detected, the UE stops to receive the associated SPS PDSCH transmission in RRC idle/inactive state.

To update an activated semi-persistent scheduling, in a first example, the gNB may first send a deactivation signaling to deactivate the ongoing SPS PDSCH transmission and reception, and then the gNB may update the information of the semi-persistent scheduling by reconfiguring the RRC configuration and/or sending a new activation signaling with updated information. Or, in a second example, the gNB may update an ongoing activated SPS PDSCH transmission without deactivation. For example, the gNB may send a signaling to update the SPS PDSCH transmission while the SPS PDSCH transmission is activated. The update signaling may be an downlink control signaling, e.g., a group common DCI or a UE specific DCI, which is transmitted through a group common PDCCH or dedicated PDCCH. Or the update signaling may be a reference signal, e.g., CSI-RS, TRS, etc.

It is disclosed herein that the functionality of the configured scheduling and the semi-persistent scheduling of the MBS PDSCH for the UEs in RRC idle/inactive state may be enabled and disabled. A UE may determine whether configured scheduling and the semi-persistent scheduling is enabled or disabled through the RRC signaling or MAC-CE transmitted by the gNB.

For example, the gNB may indicate through broadcast signaling if the configured scheduling and/or the semi-persistent scheduling of the MBS PDSCH for the UEs in RRC idle/inactive state is supported or used for a cell, e.g., for the current cell or for other cells, through the broadcasted system information, e.g., through MIB, or through one of the existing SIB, or through a new SIB, through the logical channel MBS-MCCH, etc.

Or the configured scheduling and the semi-persistent scheduling may be enabled or disabled based per cast type. For example, the configured scheduling may be enabled for the broadcast service in RRC idle/inactive state, and the semi-persistent scheduling may be enabled for the multicast service in RRC idle/inactive state, etc. Such information may be pre-specified in the specification, or may be configured by the gNB, e.g., through the broadcasted signaling disclosed above.

Or the configured scheduling and the semi-persistent scheduling may be enabled or disabled per MBS service, e.g., configured scheduling and/or the semi-persistent scheduling may be enabled for one MBS service and may be disabled for another MBS service based on the signaling, e.g., RRC signaling or MAC-CE transmitted by the gNB.

Beam Sweeping for MBS in RRC Idle/Inactive

To help the UE to monitor the PDCCH, an MBS monitoring occasion may be configured for UEs in RRC idle/inactive. Dedicated MBS monitoring occasions may be configured for different multicast/broadcast services separately. Within one MBS monitoring occasion, one or more PDCCH monitoring occasions may be allocated where the monitoring occasions may be associated with one or more SSBs transmitted by the gNB.

The gNB may configure a list of the multicast/broadcast services provided in its cell, e.g., through MBSInfoList. The UE may determine the start of the MBS monitoring occasion based on the order of the multicast/broadcast service within the list. Or the UE may determine the start of the MBS monitoring occasion based on the ID configured for the multicast/broadcast service or for a group of multicast/broadcast services.

The MBS monitoring occasion may be configured with respect to the paging occasion, e.g., the MBS monitoring occasion and the paging occasion may have a fixed time offset, where the offset may be configured by the gNB. Or, alternatively, the MBS monitoring occasion may be configured with respect to the associated SSB, e.g., the MBS monitoring occasion and the SSB transmission may have a fixed time offset, where the offset may be configured by the gNB.

Within the MBS monitoring occasion, the UE may try to detect and decode the DCI scheduling the MBS in the PDCCH monitoring occasion. Once the UE decodes the DCI, the UE may determine the time and frequency of the scheduled MBS PDSCH and may determine the QCL assumption to receive the PDSCH. In one case, the UE may assume the PDSCH may be always QCL-ed with the PDCCH, e.g., with respect to QCL type D, etc. In this case, no extra signaling is needed. In another case, the QCL assumption to receive the PDSCH may be explicitly indicated in the DCI, e.g., using the TCI field which is similar to the unicast behavior.

As the gNB may need to deliver the MBS to all the UEs within the cell, beam sweeping may be used. For example, the gNB may transmit the same MBS PDSCH on multiple beams which are associated with different SSBs. In this case, within one MBS monitoring occasion, multiple PDCCH monitoring occasions may be allocated for multiple SSBs.

In one alternative, we disclose that PDCCH monitoring occasions for MBS which are not overlapping with UL symbols (determined according to tdd-UL-DL-ConfigurationCommon) are sequentially numbered from one in the MBS monitoring occasion.

Figure 11:
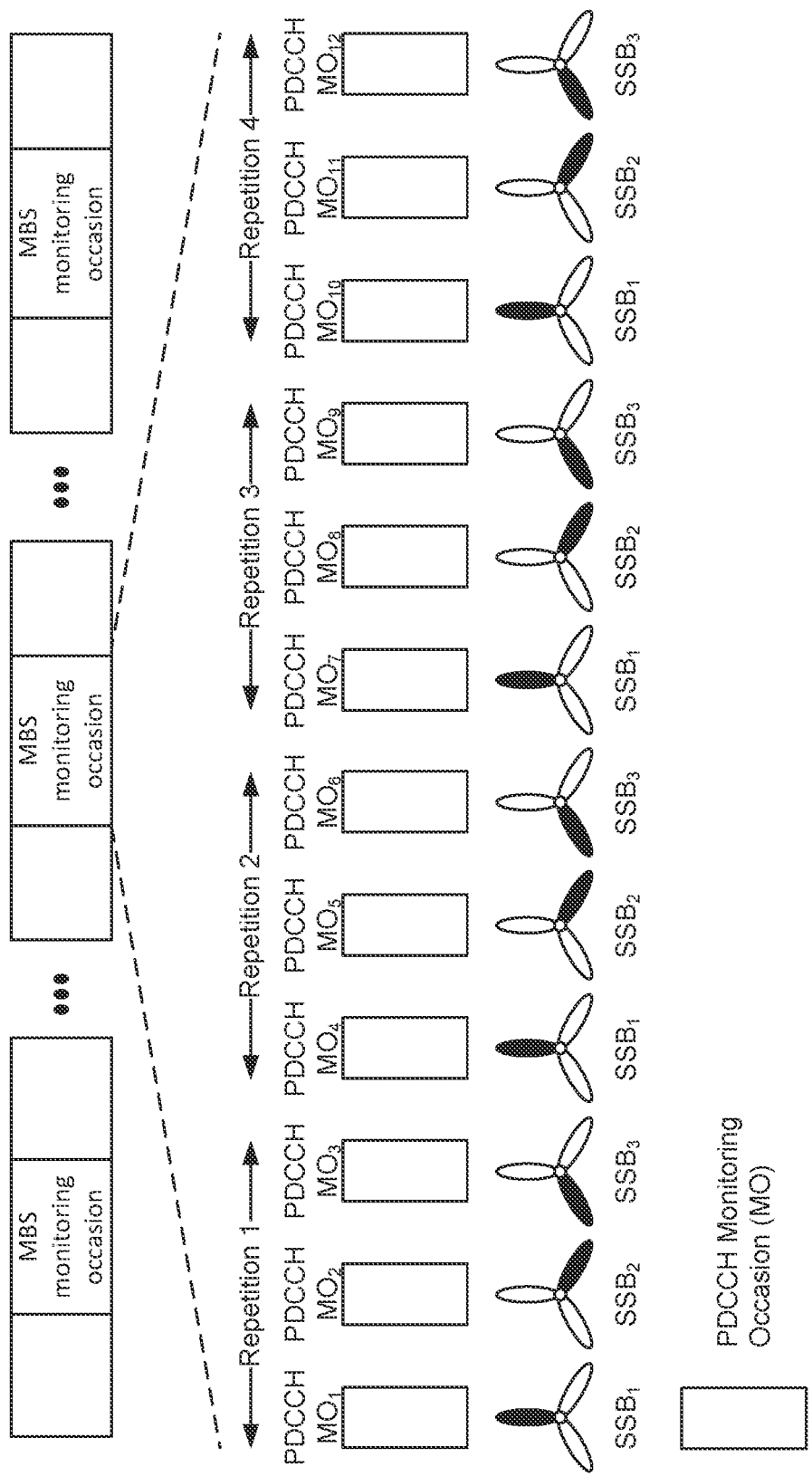
FIG. 11 illustrates a first alternative for the MBS Physical Downlink Control Channel (PDCCH) monitoring occasions pattern.

The $[x \times N + K]^{th}$ PDCCH monitoring occasion (s) for MBS in MBS monitoring occasion corresponds to the $K^{th}$ transmitted SSB, where $x=0, 1, \ldots X-1$, $K=1, 2, \ldots N$, N is the number of actual transmitted SSBs determined according to ssb-PositionsInBurst in SIB1 and X is equal to CEIL (number of PDCCH monitoring occasions in MBS monitoring occasion/N). The UE may assume the transmitted PDCCH and the corresponded SSB are QCL-ed, e.g., QCL-ed with respect to QCL type D, and QCL type A, etc. FIG. 11 shows an example of the disclosed PDCCH monitoring occasions pattern with N=3 SSBs are transmitted and X=4 repetitions for each SSB.

Figure 12:
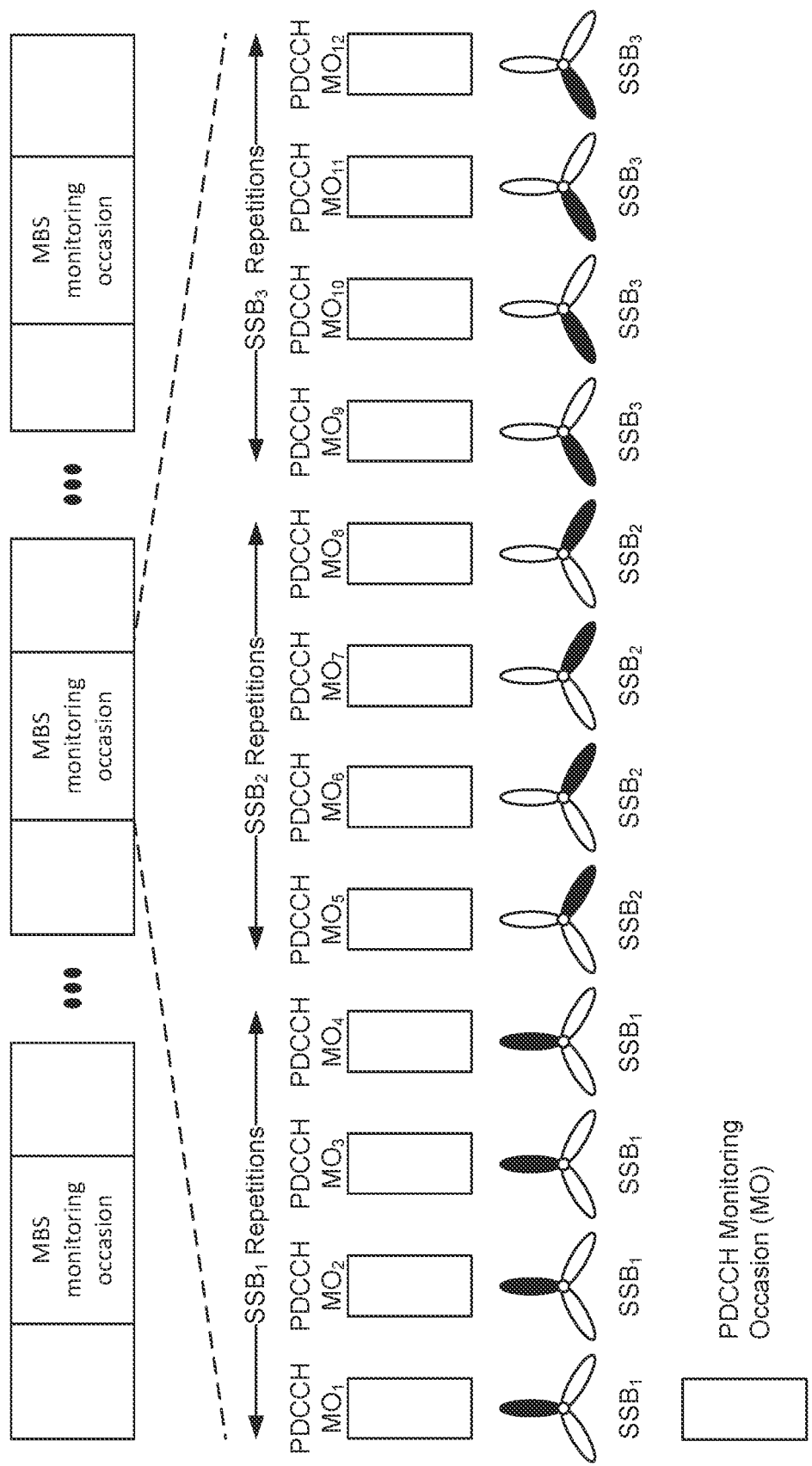
FIG. 12 illustrates a second alternative for the MBS PDCCH monitoring occasions pattern.

In another alternative, we disclose that PDCCH monitoring occasions for MBS which does not overlap with UL symbols (determined according to tdd-UL-DL-ConfigurationCommon) are sequentially numbered starting from one in the MBS monitoring occasion. The $[(K-1) \times X + x]^{th}$ PDCCH monitoring occasion (s) for MBS in MBS monitoring occasion corresponds to the $K^{th}$ transmitted SSB, where $x=0, 1, \ldots X-1$, $K=1, 2, \ldots N$, N is the number of actual transmitted SSBs determined according to ssb-PositionsInBurst in SIB1 and X is equal to CEIL (number of PDCCH monitoring occasions in MBS monitoring occasion/N). The UE may assume the transmitted PDCCH and the corresponded SSB are QCL-ed, e.g., QCL-ed with respect to QCL type D, and QCL type A, etc. FIG. 12 shows an example of the disclosed PDCCH monitoring occasions pattern with N=3 SSBs are transmitted and X=4 repetitions for each SSB.

Repetition for MBS in RRC Idle/Inactive

PDSCH Repetition

To improve the reliability and the coverage of the MBS transmission in RRC idle/inactive, PDSCH repetition may be supported. The PDSCH carrying the same transmission block (TB) of the MBS traffic may be repeated k times in the time domain. In this disclosure, the k PDSCH occasions are denoted as $1^{st}$ repetition, $2^{nd}$ repetition, ..., $k^{th}$ repetition, respectively. The k repetitions may be transmitted with the same or different power levels, redundancy versions (RV), durations, modulation coding schemes (MCS), etc. In some cases, a TB is mapped to the k PDSCH occasions, rather than being repeated. In other words, the number of available REs for the TB transmission is based on the k PDSCH occasions. Comparing to transmit the TB in a single PDSCH occasion, since there are more available REs, the information can be transmitted using a lower modulation level and/or coding rate to improve the performance.

A variety of options exist for PDSCH repetition for the MBS in RRC idle/inactive. The solutions described herein may be applied to a PDSCH that is dynamically scheduled or a PDSCH that is scheduled without a dynamic grant, e.g., configured scheduled, or semi-persistent scheduled, etc.

The number of repetitions, e.g., the value of k, may be pre-specified in the specification with a fixed value, e.g., k=4. Or the value of k may be configurable and the gNB signals the value to the UE.

In a first example, a UE may determine the value of k through the RRC signaling sent by the gNB. An RRC parameter, e.g., NumberofRepetition, may be used to indicate such information. The mechanisms disclosed for configuring the RRC configurations used for MBS in RRC idle/inactive may be also applied here.

The RRC parameter may be inherited from the RRC configuration configured in RRC connected state or configured by the RRCRelease message when the UE transits from RRC connected state to RRC idle/inactive state. Alternatively, the RRC parameter may be carried by an RRC configuration configured in RRC connected idle/inactive state. For example, a new SIB, e.g., SIB16, or one of the existing RRC signalings, e.g., through the SIB1. Or, the RRC parameter may be signaled through a new logical channel, e.g., MBS-MCCH as disclosed in this disclosure.

In a second example, for the dynamically scheduled PDSCH and the semi-persistent scheduled PDSCH, the value of k may be indicated by the scheduling DCI or the activation DCI. For example, a set of candidate values may be configured by the RRC signaling. A field, e.g., Number of Repetition field, in the scheduling DCI or the activation DCI may indicate one out of the configured candidate values to the UE. Or the DCI signaling may be used standalone, i.e., the candidate values are fixed in the spec. For example, assuming 2 bits are used for this field, '00' indicates k=0, '01' indicates k=1, '10' indicates k=2, '11' indicates k=3, etc.

Besides the number of repetitions, a UE also needs to determine the time locations of the k repetitions to receive the MBS service. In a first example, the PDSCH for the MBS transmission may be repeated in time with a fixed time gap. The time gap may be a fixed number of slots, or may be a fixed number of symbols, or a fixed number of slots and symbols which is pre-specified in the specification.

Figure 15:
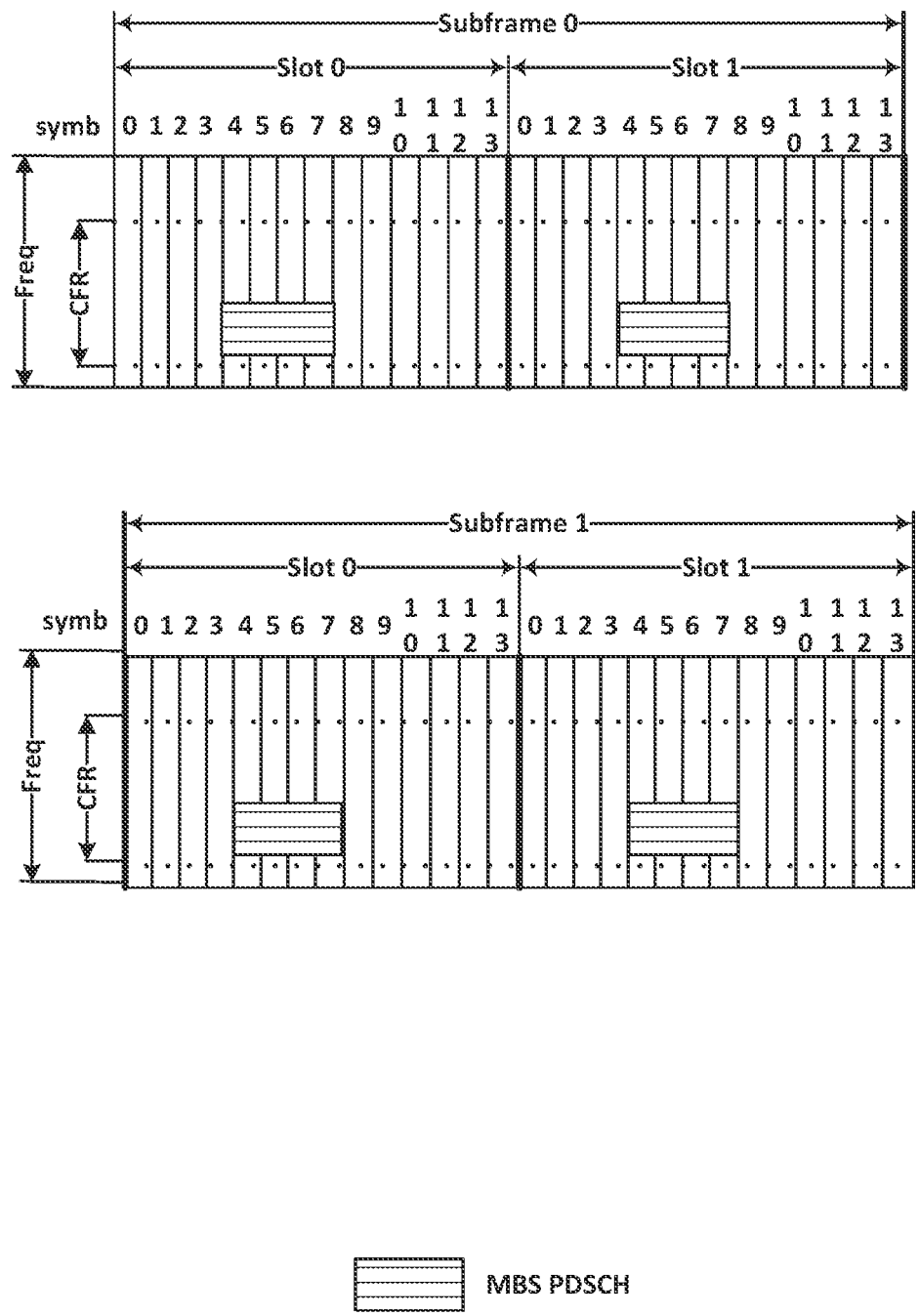
FIG. 15 is a time and frequency diagram of an example of MBS Physical Downlink Shared Channel (PDSCH) repetition with a time gap fixed to one slot.

An example is shown in FIG. 15. In this example, the time gap is fixed to be one slot. The symbols carrying the PDSCH repetitions in each slot are the same for the k repetitions. Assume that the UE determines the time domain resource allocation for the $1^{st}$ repetition, e.g., symbol 4 to symbol 7 in the slot 0 of the subframe 0, the UE may receive the $2^{nd}$ repetition in the symbol 4 to symbol 7 in the slot 1 of the subframe 0, receive the $3^{rd}$ repetition in the symbol 4 to symbol 7 in the slot 0 of the subframe 1, etc.

In a second example, the time gap may be configurable. For example, a UE may be signaled by the gNB with the time gap in number of slots. The methods disclosed for signaling the number of repetitions may be also applied here. The time gap that in term of the number of slots may be configured by the RRC signaling only, or by the DCI signaling only, or by the combination of the RRC signaling and the DCI signaling.

Figure 16:
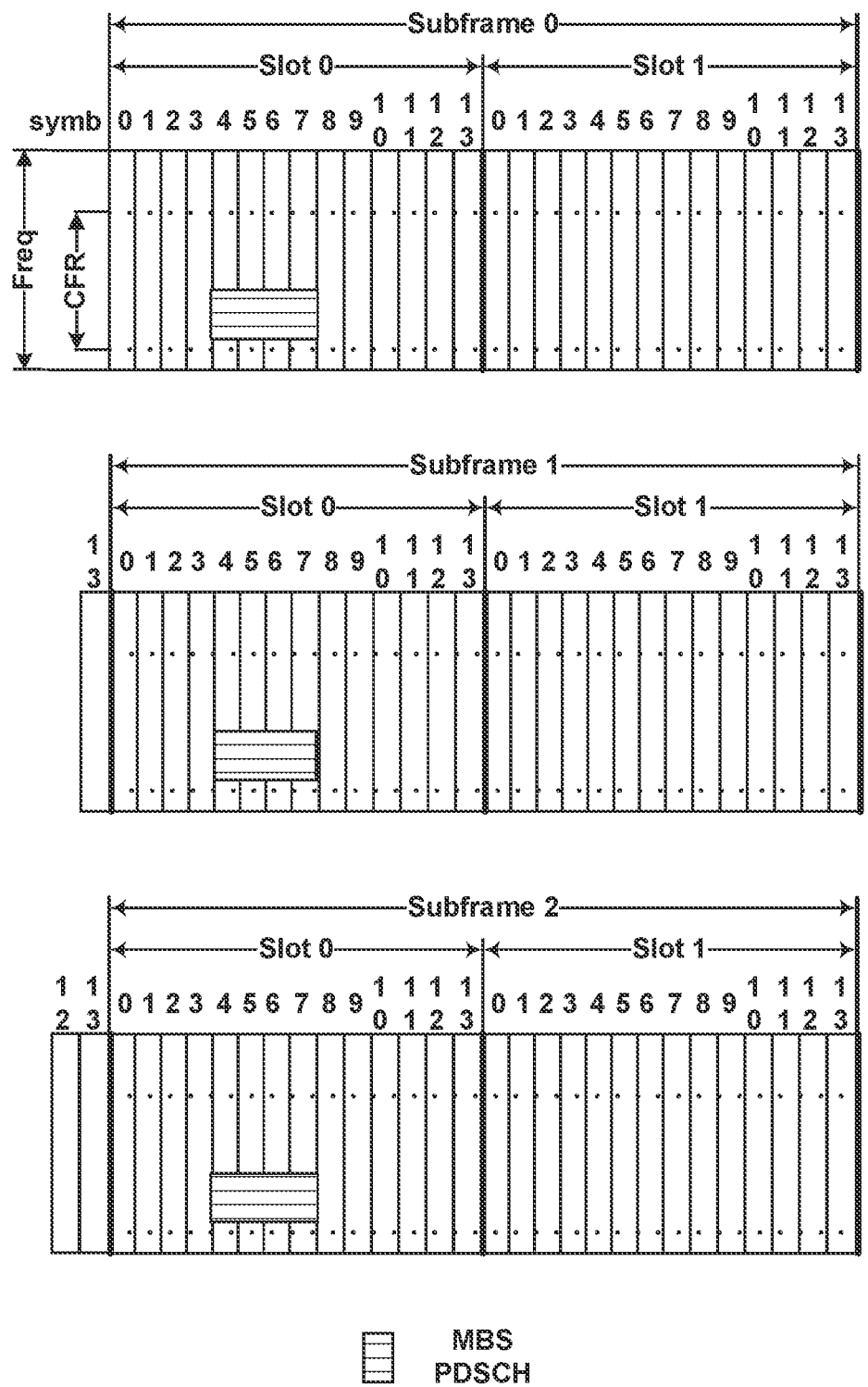
FIG. 16 is a time and frequency diagram of an example of MBS PDSCH repetition with a time gap configured to be two slots.

An example is shown in FIG. 16. In this example, the time gap is configured to be two slots. The symbols carrying the PDSCH repetitions in each slot are the same for the k repetitions. Assume that the UE determines the time domain resource allocation for the $1^{st}$ repetition, e.g., symbol 4 to symbol 7 in the slot 0 of the subframe 0, the UE may receive the $2^{nd}$ repetition in the symbol 4 to symbol 7 in the slot 0 of the subframe 1, receive the $3^{rd}$ repetition in the symbol 4 to symbol 7 in the slot 0 of the subframe 2, etc.

Or a UE may be signaled by the gNB with the time gap in number of symbols through the RRC signaling only, or through the DCI signaling only, or through the combination of the RRC signaling and the DCI signaling.

In one example, the time gap may denote the time difference between the beginning of two consecutive repetitions. Or, in another example, the time gap may denote the time difference between the ending of two consecutive repetitions. Or, in yet another example, the time gap may denote the time difference between the ending of one repetition, e.g., $n^{th}$ repetition, and the beginning of the next repetition, e.g., $(n+1)^{th}$ repetition.

Figure 17:
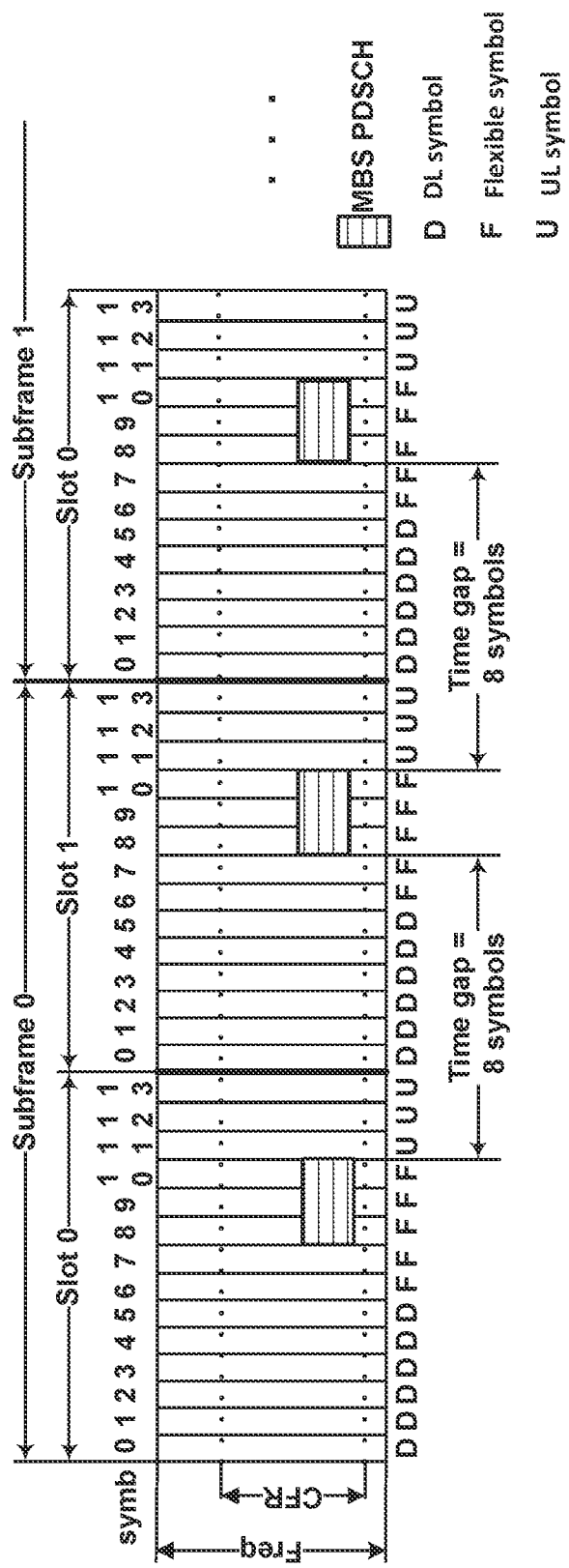
FIG. 17 is a time and frequency diagram of an example of MBS PDSCH repetition with a time gap counting all the symbols.

When counting the time gap, the UE may count all the symbols regardless whether they are labeled as DL symbol or flexible symbol or the UL symbol. An example is shown in FIG. 17.

In this example, the time gap is assumed to be 8 symbols and denote the time difference between the ending of one repetition and the beginning of the next repetition. The $1^{st}$ repetition is allocated in symbol 8 to symbol 10 in the slot 0 of the subframe 0. With the above assumptions, the UE may determine the $2^{nd}$ repetition is transmitted in in symbol 5 to symbol 7 in the slot 1 of the subframe 0, and the $3^{rd}$ repetition is transmitted in in symbol 2 to symbol 4 in the slot 0 of the subframe 1, etc.

Figure 18:
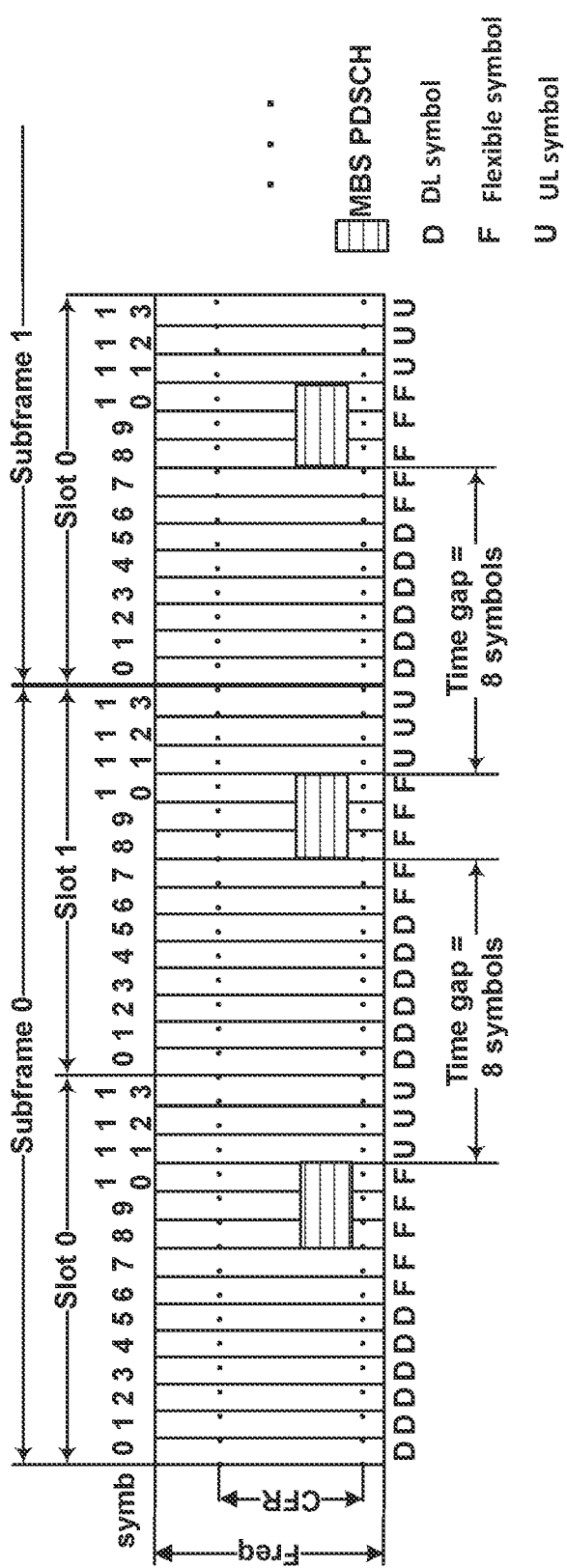
FIG. 18 is a time and frequency diagram of an example of MBS PDSCH repetition with a time gap counting only DL symbols and flexible symbols.

Or the UE may only count the symbols labeled as DL symbol or flexible symbol and skip the symbols labeled as UL symbol. An example is shown in FIG. 18. FIG. 18 has the same other assumptions on the time gap length, time gap meaning, and the time location of the $1^{st}$ repetition as FIG. 17. However, as the UE only counts the DL symbols and flexible symbols as the time gap, the UE will determine that the $2^{nd}$ repetition is transmitted in in symbol 8 to symbol 10 in the slot 1 of the subframe 0, and the $3^{rd}$ repetition is transmitted in in symbol 8 to symbol 10 in the slot 0 of the subframe 1, etc.

Figure 19:
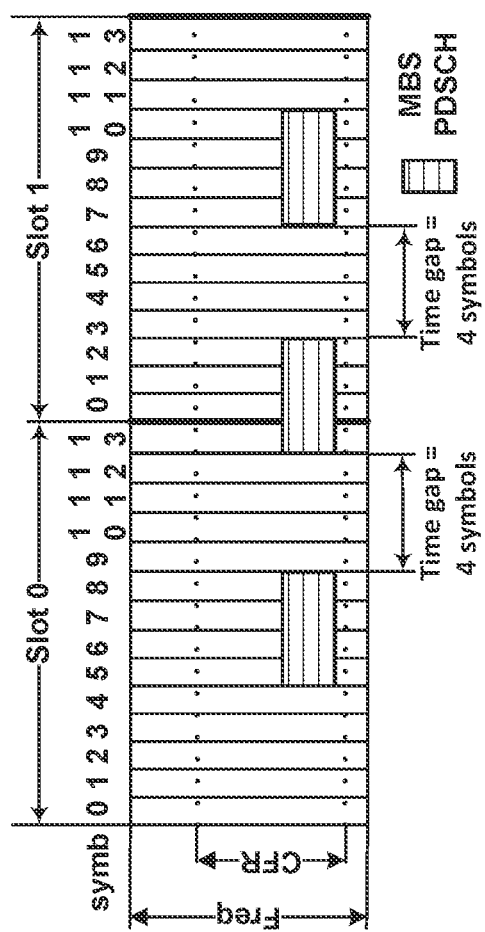
FIG. 19 is a time and frequency diagram of an example where MBS PDSCH repetition spans across two slots.

When the time gap is in number of symbols, one scenario that may happen is one repetition may span across two slots. For example, assume the $1^{st}$ repetition is allocated in symbol 5 to symbol 8 in slot 0 and the time gap is 4 symbols, the $2^{nd}$ repetition is transmitted in symbol 13 in slot 0 to symbol 2 in slot 1 which crosses the slot boundary as shown in FIG. 19.

In one case, cross slot PDSCH may be supported to adapt this scenario. Or in another case, one PDSCH cannot cross the slot boundary. Then, the repetition that crosses the slot boundary may be dropped or may be shifted.

When a repetition is dropped, the total number of repetitions transmitted may be reduced by one. Or the total number of repetitions may be maintained the same by adding one repetition at the end of the whole transmission, e.g., adding one repetition after the last repetition with the same time gap.

When a repetition is shifted, the repetition may be always shifted to the latter slot, e.g., the $2^{nd}$ repetition is shifted to slot 1 and is transmitted in symbol 0 to symbol 3. Or the repetition may be always shifted to the earlier slot, e.g., the $2^{nd}$ repetition is shifted to slot 0 and is transmitted in symbol 10 to symbol 13.

Or the repetition may be always shifted to the slots that more symbols are belong to, e.g., the $2^{nd}$ repetition is shifted to slot 1 and is transmitted in symbol 0 to symbol 3. Meanwhile, when the repetition is evenly distributed across two slots, the repetition may be always shifted to the earlier slot or the latter slot.

When a repetition is shifted due to crossing the slot boundary, the transmission of the following repetition may be also affected. When the $n^{th}$ repetition is shifted, the location of the $(n+1)^{th}$ repetition may be calculated based on the shifted $n^{th}$ repetition. Using FIG. 19 as example, assume the $2^{nd}$ repetition is shifted to the symbol 0 to symbol 3 in slot 1, the $3^{rd}$ repetition may be shifted to symbol 8 to symbol 11 to maintain the 4 symbols time gap, and the following repetitions may be also shifted correspondingly. Or the following repetition may be not affected. E.g., the $3^{rd}$ repetition remains in the symbol 7 to symbol 10, and the following repetitions are also not affected by the shifting of the $2^{nd}$ repetition.

Another scenario that may happen is the symbols supposed to be used for transmitting the repetition may be not valid symbols. Using FIG. 19 as example, the $3^{rd}$ repetition is supposed to be transmitted in symbol 7 to symbol 10 in slot 1. However, one or more than one of these symbols may be not valid for the DL transmission, e.g., the symbol is labeled as UL symbol or the symbol is used for transmitting the SSB or is reserved for CORESET, etc. Then the associated repetition may be dropped or shifted. When the repetition is dropped, the total number of repetitions may be reduced by one, or another repetition may be added at the end of the whole transmission as we disclosed above for cross boundary scenario.

When the repetition is shifted, similar to what has been disclosed above for cross boundary scenario, the repetition may be shifted to the earlier symbols or to the latter symbols. The repetition may be shifted to the first n consecutive valid symbols for transmitting, where n is the symbol length of the repetition. Or the repetition may be shifted to the nearer n consecutive valid symbols between the earlier symbols and the latter symbols.

The ideas here may also apple for the case where the time gap is in term of slot. For example, if one PDSCH occasion needs to be dropped in one slot, e.g., due to UL slot, the repetition may be dropped, e.g., with or without adding another repetition adding in the end. Or the repetition may be shifted, e.g., shifted to the next available DL slot, with the following slot may be affected or not affected as disclosed above.

Figure 20A:
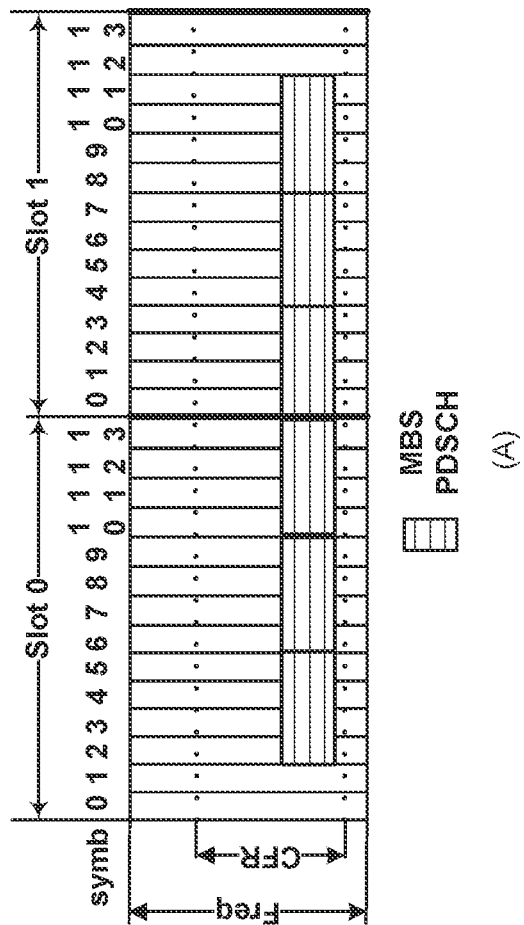
FIG. 20A is a time and frequency diagram of an example of MBS PDSCH repetition with no time gap and consecutive repetitions across slots.
Figure 20B:
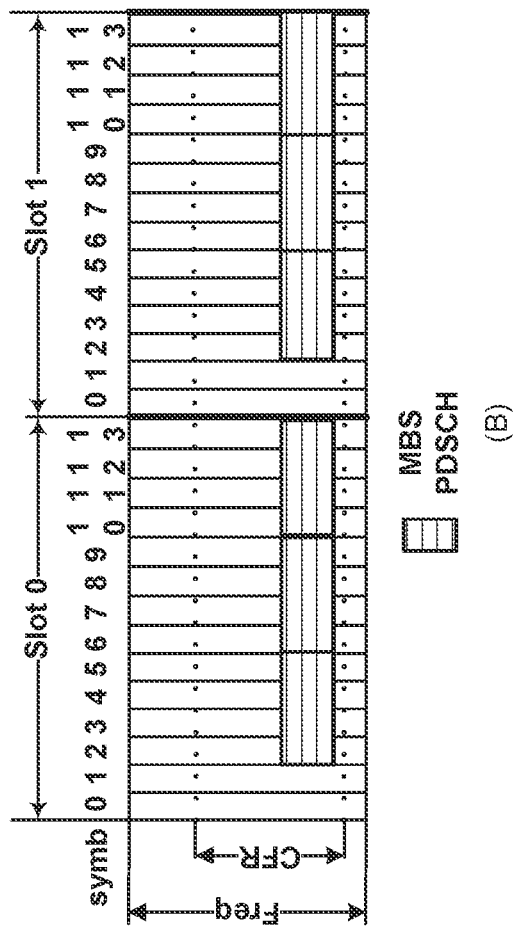
FIG. 20B is a time and frequency diagram of an example of MBS PDSCH repetition with no time gap and the same time location across slots.

In a third example, the repetitions may be transmitted back-to-back, e.g., the repetitions may be transmitted consecutively with no time gap. Examples are shown in FIG. 20. The repetitions may be confined within one slot. Or the repetitions may span multiple slots. When spanning multiple slots, the last repetition in the first slot and the first repetition in the second slot may be also consecutive in time. E.g., as shown in FIG. 20(A), the $3^{rd}$ repetition and the $4^{th}$ repetition are adjacent to each other. Or the repetitions in each slot may have the same time location. E.g., as shown in FIG. 20(B), the $3^{rd}$ repetition and the $4^{th}$ repetition are not adjacent to each other. Within the slot that the repetition belongs to, the time location of the $4^{th}$ repetition is same as the time location of the $1^{st}$ repetition, and so on.

The same PDSCH may be transmitted in the MBS PDSCH repetitions. Or the PDSCH repetitions may carry the different RVs of the same TB. The RV of each PDSCH repetition may be pre-specified in the specification, e.g., pre-specified to be 0303. Or the RV of each PDSCH repetition may be signaled to the UE by the RRC signaling only, or by the DCI signaling only, or by the combination of the RRC signaling and the DCI signaling. The UE may soft-combine the received PDSCH repetitions which are carrying the different RVs of the same TB and decode the information carried by them.

In the above examples, the PDSCH repetition related parameters, e.g., number of repetitions, time gap, RV of the PDSCH, etc., are separately signaled. It is also disclosed herein that some of the parameters may be jointly signaled. For example, an RRC parameter may be used to jointly configured the number of repetition and the time gap in slot or in symbol. Or a DCI field may be used to indicated one out of a set of candidate number of repetition and the time gap in slot or in symbol values.

As the MBS may service different purposes, some of the services may not need PDSCH repetition. We disclose that the MBS PDSCH repetition may be enabled and disabled. The MBS PDSCH repetition may be enabled and disabled by the RRC signaling only, or by the DCI signaling only, or by the MAC-CE only, or by the combination of the RRC signaling and DCI signaling, or by the combination of the RRC signaling and MAC-CE signaling.

When a single signaling is used for enabling and disabling, the signaling may explicitly indicate whether the MBS PDSCH repetition is enabled or disabled. When the enabling and disabling signaling is the combination of the RRC signaling and another signaling, e.g., MAC-CE or DCI, in a first example, the RRC signaling may configure whether the MAC-CE based, or DCI based enabling and disabling function is supported. If the function is supported, the MAC-CE signaling or the DCI signaling indicate whether the MBS PDSCH repetition is enabled or disabled, otherwise, the RRC signaling configures the whether the MBS PDSCH repetition is enabled or disabled.

Or, in a second example, RRC signaling may configure whether the enabling and disabling function is supported. If the function is not supported, the MBS PDSCH repetition may be always enabled or may be always disabled, otherwise, the MAC-CE signaling or the DCI signaling indicate whether the MBS PDSCH repetition is enabled or disabled.

Furthermore, DMRS sharing may be supported for the MBS PDSCH repetition in RRC idle/inactive. The DMRS may not be transmitted in all the MBS PDSCH repetitions. If the DMRS is not transmitted in one of the repetitions, the UE may utilize the DMRS received in other repetitions to estimate the channel and help decode the data. For example, the DMRS may be transmitted in every $n^{th}$ repetition. The value of n may be signaled by the RRC signaling only, or by the DCI signaling only, or by the combination of the RRC signaling and the DCI signaling. Assume n=2 is signaled, the DMRS is transmitted in the $1^{st}$ repetition, $3^{rd}$ repetition, $5^{th}$ repetition, and so on. In another example, a UE may be signaled with the ratio of the DMRS transmitted and the total number repetition. For example, a UE may be signaled with the ratio=1/3, the DMRS is transmitted in every third repetition. Or the DMRS may be transmitted only in the first repetition, and not transmitted in all the rest repetitions. Or the DMRS may be transmitted only in the first repetition and the last repetition, and not transmitted in all the rest repetitions. Or a UE may be explicitly indicated with DMRS is transmitted in which repetitions and is not transmitted in which repetitions, e.g., through a bitmap, where '1' indicates DMRS is transmitted and '0' indicates DMRS is not indicated.

When a DMRS is not transmitted in one repetition due to DMRS sharing, the resources allocated to this repetition may be reduced correspondingly. Or the allocated resources may be remained the same. The PDSCH is transmitted in a higher MCS level, etc.

When DMRS sharing is applied, we also disclose that the DMRS power boosting may be applied to the transmitted DMRS to improve the performance.

PDCCH Repetition

To improve the reliability and the coverage of the MBS transmission, PDCCH repetition may be also supported. The PDCCH repetitions may carry the same downlink control information. The UE may soft-combine the received DCIs and decode the information carried them. In some cases, one DCI may be mapped to the k PDCCH occasions, rather than being repeated. In other words, the number of available REs for the DCI transmission is based on the k PDCCH occasions.

PDCCH may be repeated for MBS in RRC idle/inactive. The solutions described herein may be applied to the PDCCH carrying the DCI for dynamically scheduling the MBS PDSCH transmission, or the DCI for activating or deactivating the SPS MBS PDSCH.

In a first example, the PDCCHs may be repeated in the same CORESET. Within a CORESET, the PDCCH repetitions may be transmitted in TDM manner or in frequency-division multiplexing (FDM) manner or in a combination of TMD and FDM.

The PDCCH repetitions may be transmitted with no association, e.g., the gNB may send the CORESET repetitions in any location within the CORESET. In this approach, the gNB has more flexibility to select the resources used for the transmission of the PDCCH repetitions, therefore these is a higher chance that the PDCCH repetitions can be transmitted. However, as the UE does not know any information where the PDCCHs will be transmitted within the CORESET, the UE needs to blindly decode all of the PDCCH repetition candidate locations, which requires more blind decoding efforts, where the number of PDCCH repetitions may be configured to the UE by the gNB through the RRC signaling. The RRC signaling mechanisms disclosed herein for PDSCH repetition may be also applied here and other RRC signalings.

In another approach, there may be pre-defined association among the PDCCH repetitions. As additional restrictions are introduced for the PDCCH repetition, the scheduling flexibility is impacted. However, this approach will benefit the UE since the UE may determine the location of the PDCCH repetition based on the pre-defined association, therefore reducing the blind decoding efforts.

Examples of the association are shown in FIG. 21. In FIG. 21(A), the PDCCH repetitions are TDM-ed and have the same frequency domain resource location. The PDCCH repetitions may be transmitted back-to-back in the time domain. Or they may be transmitted with one symbol time gap. The time gap may be pre-specified in the specification. Or the time gap may be configured by the RRC signaling with either 0 symbol, e.g., back-to-back, or 1 symbol.

In FIG. 21(B), the PDCCH repetitions are FDM-ed with the same frequency offset, e.g., $f_{offset}$ and are transmitted in the same symbol. The $f_{offset}$ may be pre-specified in the specification or may be configured by the RRC signaling.

In both the FIG. 21(C) and FIG. 21(D), the PDCCH repetitions are transmitted in combination of TDM-ed and FDM-ed. The UE may be configured with the frequency offset, e.g., $f_{offset}$ through RRC signaling.

In FIG. 21(C), the $f_{offset}$ denotes the relative frequency offset between two consecutive repetitions. For example, assume the $1^{st}$ repetition spans from $f_0$ to $f_1$ and the $2^{nd}$ repetition spans from $f_2$ to $f_3$, where $f_0<f_1$, and $f_2<f_3$. The $f_{offset}=f_2-f_1$.

In FIG. 21(D), the $f_{offset}$ denotes the absolute frequency offset between two consecutive repetitions. For example, assume the $1^{st}$ repetition spans from $f_0$ to $f_1$, the $2^{nd}$ repetition spans from $f_2$ to $f_3$, where $f_0<f_1$, and $f_2<f_3$. The $f_{offset}=f_2-f_1+m\times f_{BWP}$, where $f_{BWP}$ is frequency size of the BWP, e.g., in number of resource element (RE) and m is the symbol index difference between the two repetitions. So, in this approach, after determining one repetition, if the number of remaining REs in the current symbol is less than the configured frequency offset, the UE may move to the next symbol and continue the counting starting from the lowest RE of the BWP.

In a second example, the PDCCH may be repeated in multiple CORESETs. Examples are shown in FIG. 22. Among the CORESETs, the PDCCH repetitions may be transmitted with no association, e.g., as shown in FIG. 22(A). The UE needs to blindly detect and decode the PDCCH repetitions in each CORESET separately.

Or the PDCCH repetitions may be transmitted with certain association across the CORESETs. For example, the PDCCH repetitions may have the same relative location with respect to the associated CORESET. An example is shown in FIG. 22(B). Assume that the PDCCH is transmitted in the $n^{th}$ symbol in the CORESET 1, and the frequency offset is m REs or RBs with respect to the lowest RE or RB of the CORESET 1. The UE may determine the PDCCH transmitted in CORESET 2 is also transmitted in the $n^{th}$ symbol and with frequency offset of m REs or RBs.

Figure 23:
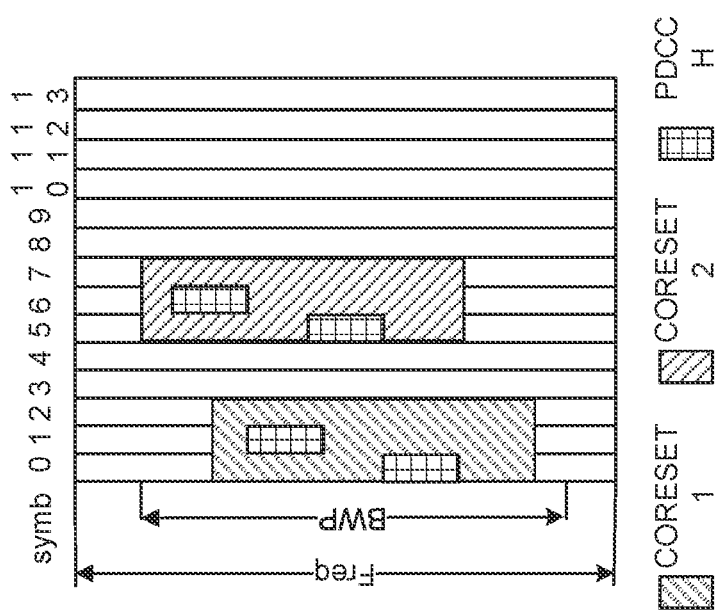
FIG. 23 shows an example of MBS PDCCHs repeated in multiple CORESETs and repeated within each CORESET.

In a third example, the PDCCH may be repeated in multiple CORESETs and also repeated in each CORESET. Example is shown in FIG. 23. The repetitions may be transmitted with no association and the UE blindly detects and decodes them.

Or, the repetition may be sent with association, e.g., with same frequency offset within the CORESET and with the same relative location across the CORESETs, to help the UE reducing the blind decoding efforts. The other associations described herein for repetition within a CORESET may be also applied here.

Figure 24:
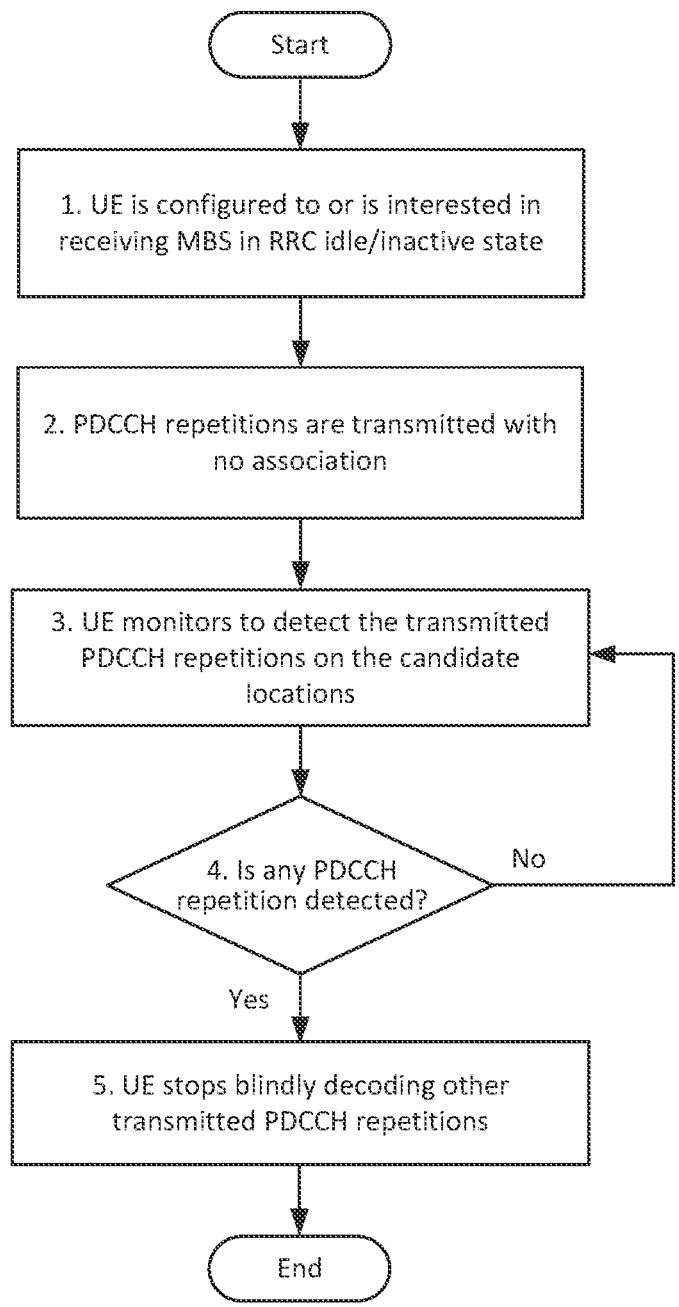
FIG. 24 is a flowchart of an example process for a UE receiving MBS DCI in RRC idle/inactive with PDCCH repetitions transmitted with no association.

When the PDCCH repetitions are transmitted with no association, a UE may blindly decode the DCI within the configured CORESET. When the UE detects the DCI, e.g., through one of the transmitted repetitions, the UE may stop the blind decoding and not continue to detect the other transmitted repetitions. The flowchart in FIG. 24 shows the exemplary steps of a UE receiving MBS DCI in RRC idle/inactive with PDCCH repetitions transmitted with no association.

Figure 25:
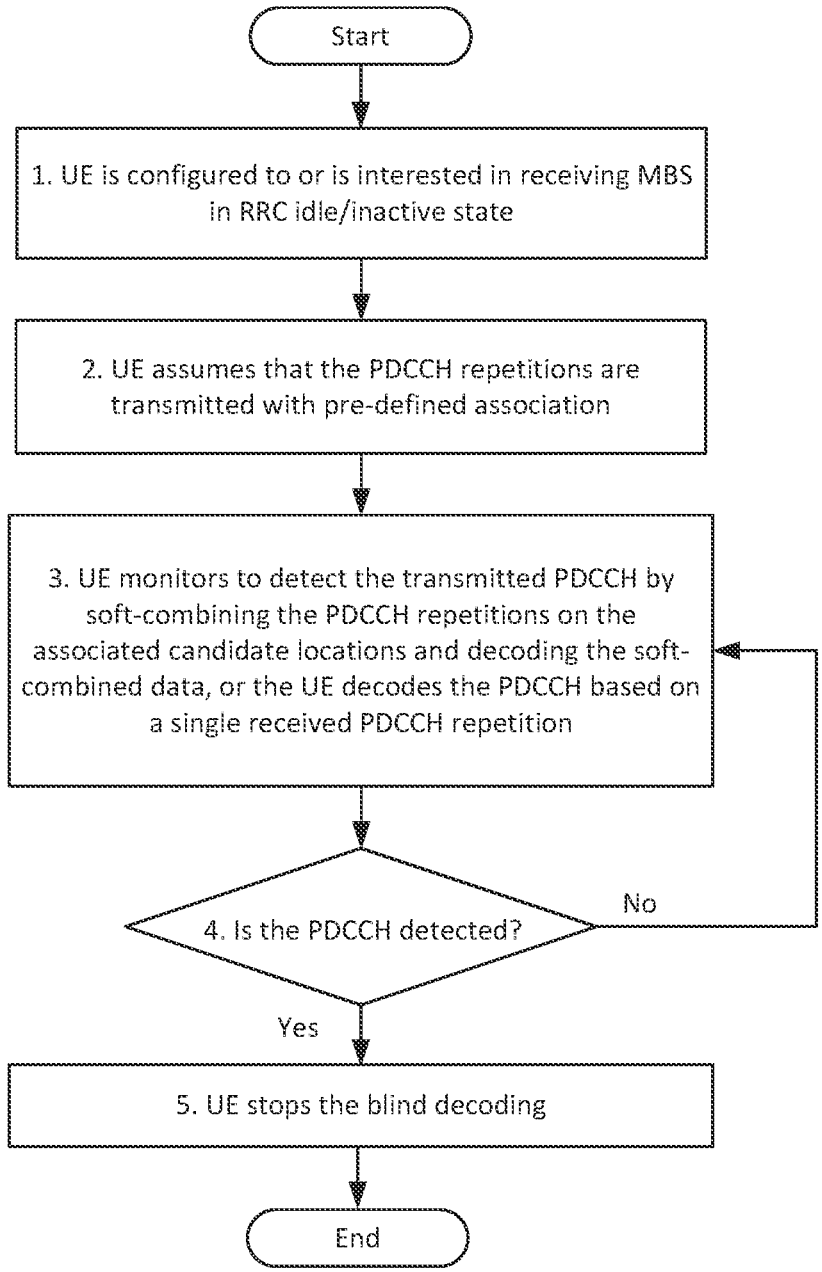
FIG. 25 is a flowchart of an example process for a UE receiving MBS DCI in RRC idle/inactive with PDCCH repetitions transmitted with pre-defined association.

Association of PDCCH repetition may be configured, pre-configured or pre-defined. For example, association of PDCCH repetitions may be configured by RRC signaling or system information. When the PDCCH repetitions are transmitted with pre-defined association, a UE may perform soft-combining to the received information to improve the probability of decoding the DCI. For example, when the UE tries to decode the DCI in one of the repetition candidate locations in the CORESET, the UE may soft-combine the information received in this candidate location with the information received in the associated repetition candidate location and decode the soft-combined data. Using FIG. 21(A), e.g., TDM-ed association, as an example, when the UE tries to decode the information received from $RB_i$ to $RB_j$ in the symbol 1, the UE may soft-combine this information with the information received from $RB_i$ to $RB_j$ in the symbol 2 and the information received from $RB_i$ to $RB_j$ in the symbol 3 and decode the soft-combined information to detect the DCI. The flowchart in FIG. 25 shows the exemplary steps of a UE receiving MBS DCI in RRC idle/inactive with PDCCH repetitions transmitted with pre-defined association.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 26A:
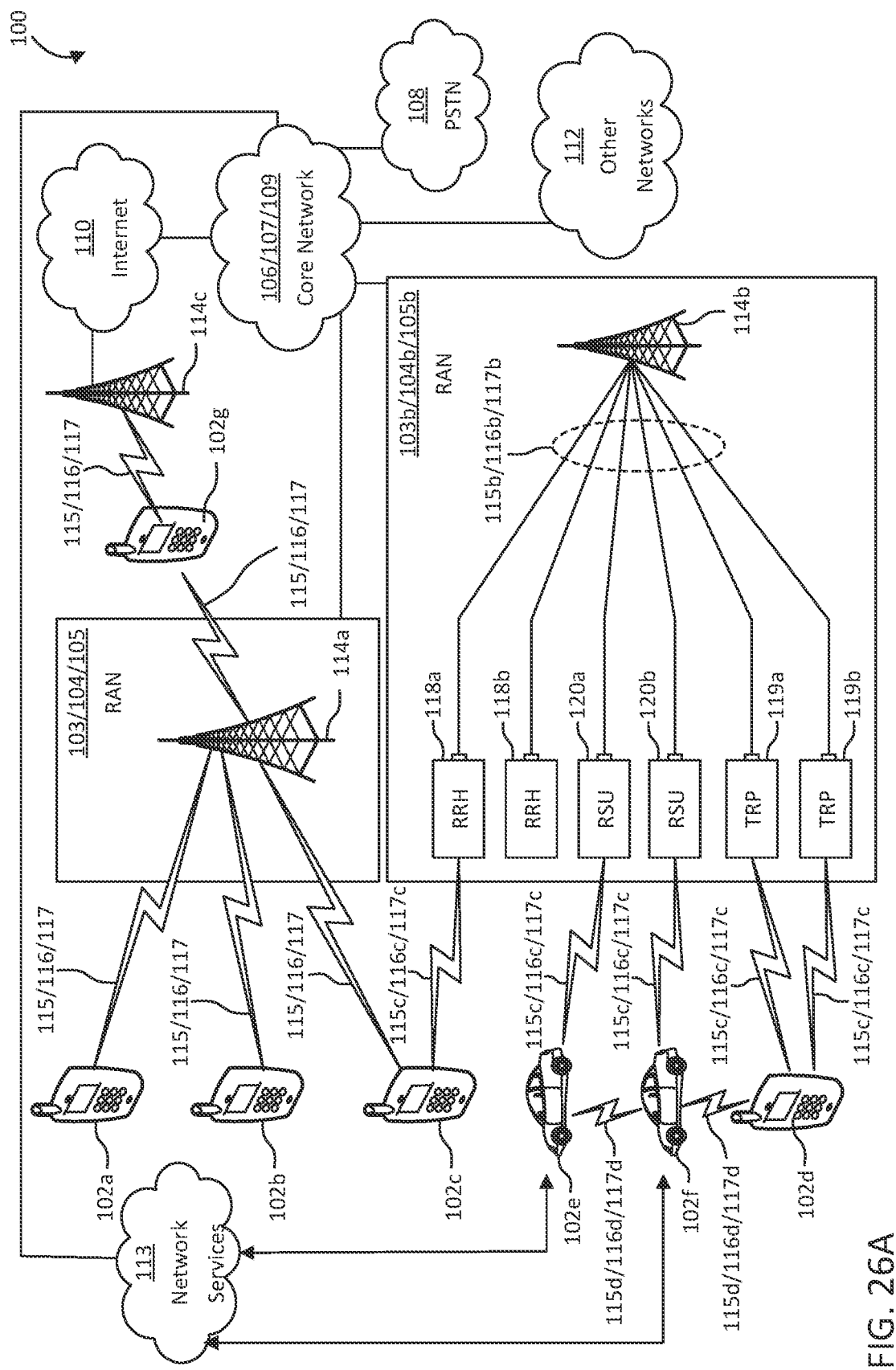
FIG. 26A illustrates an example communications system.

FIG. 26A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 26A, each of the WTRUs 102 is depicted in FIGS. 26A-E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 26A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 26A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell.

As shown in FIG. 26A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 26A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 26A may be configured to communicate with the base station 114a, which may employ a cellular-based radio technology, and with the base station 114c, which may employ an IEEE 802 radio technology.

Although not shown in FIG. 26A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 26B:
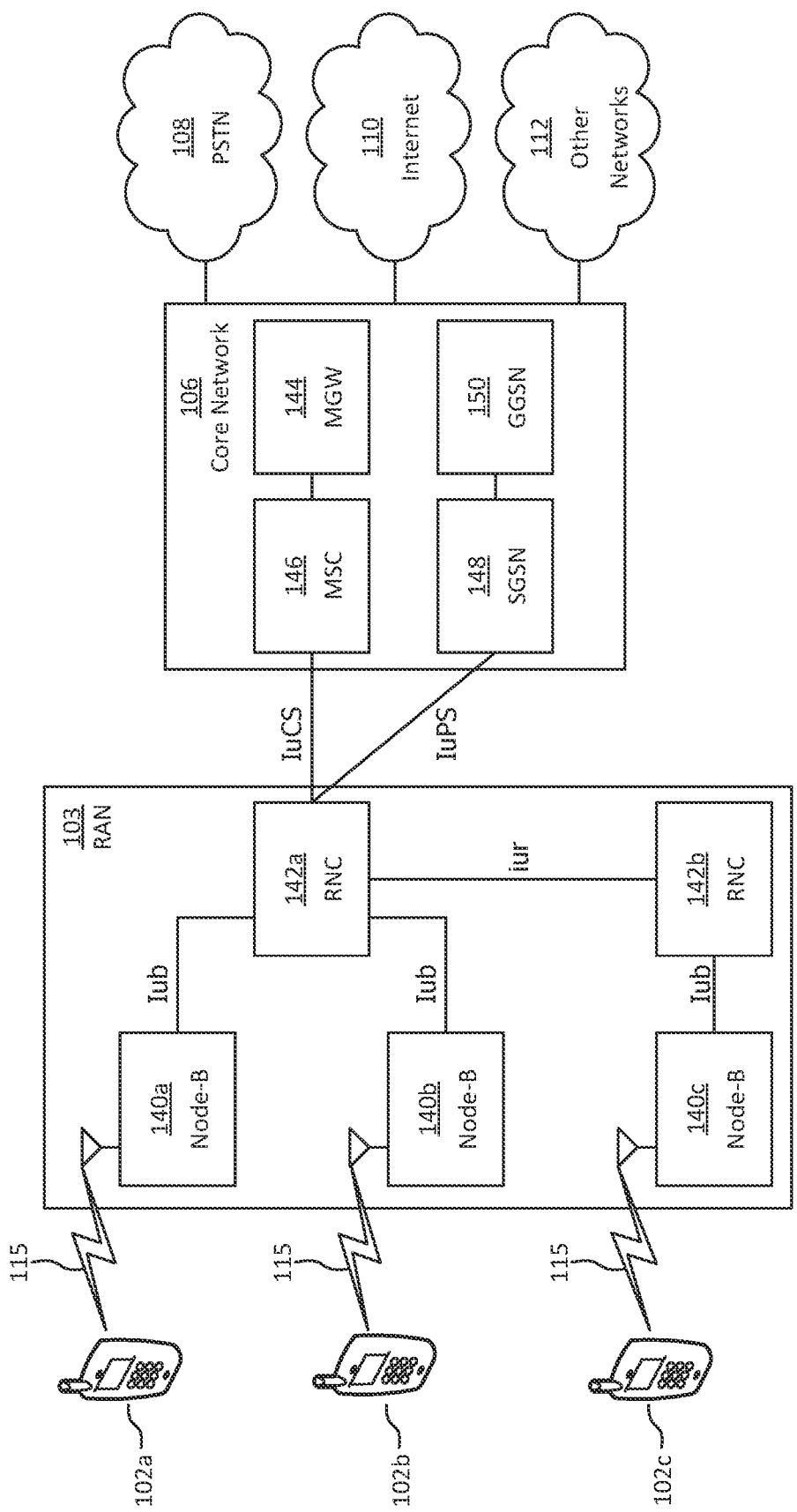
FIGS. 26B-D are system diagrams of example RANs and core networks.

FIG. 26B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 26B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 26B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 26B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 26C:
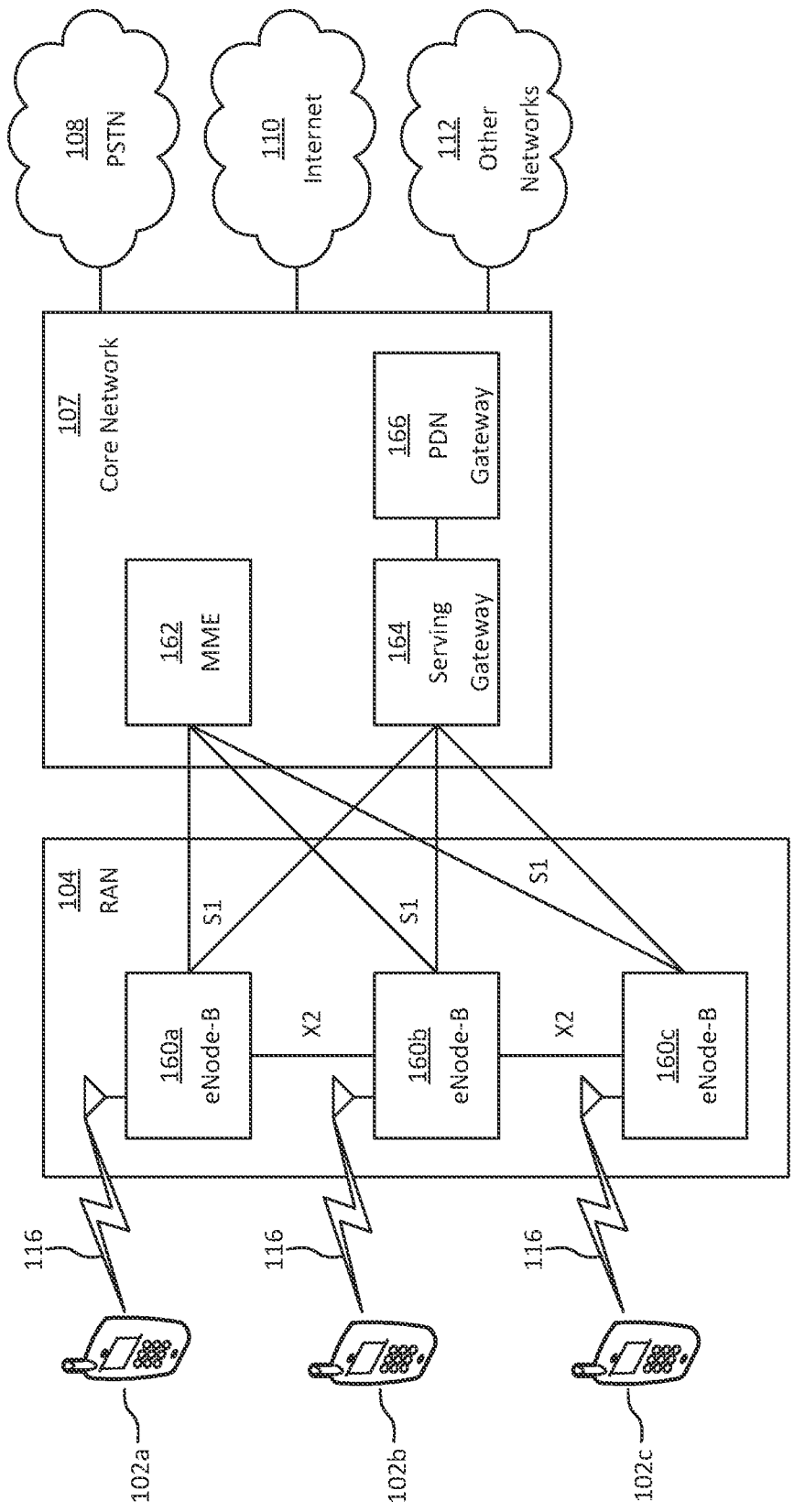

FIG. 26C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 26C, the eNode-Bs 160a, 160b, and 160c may communicate with one another over an X2 interface.

The core network 107 shown in FIG. 26C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 26D:
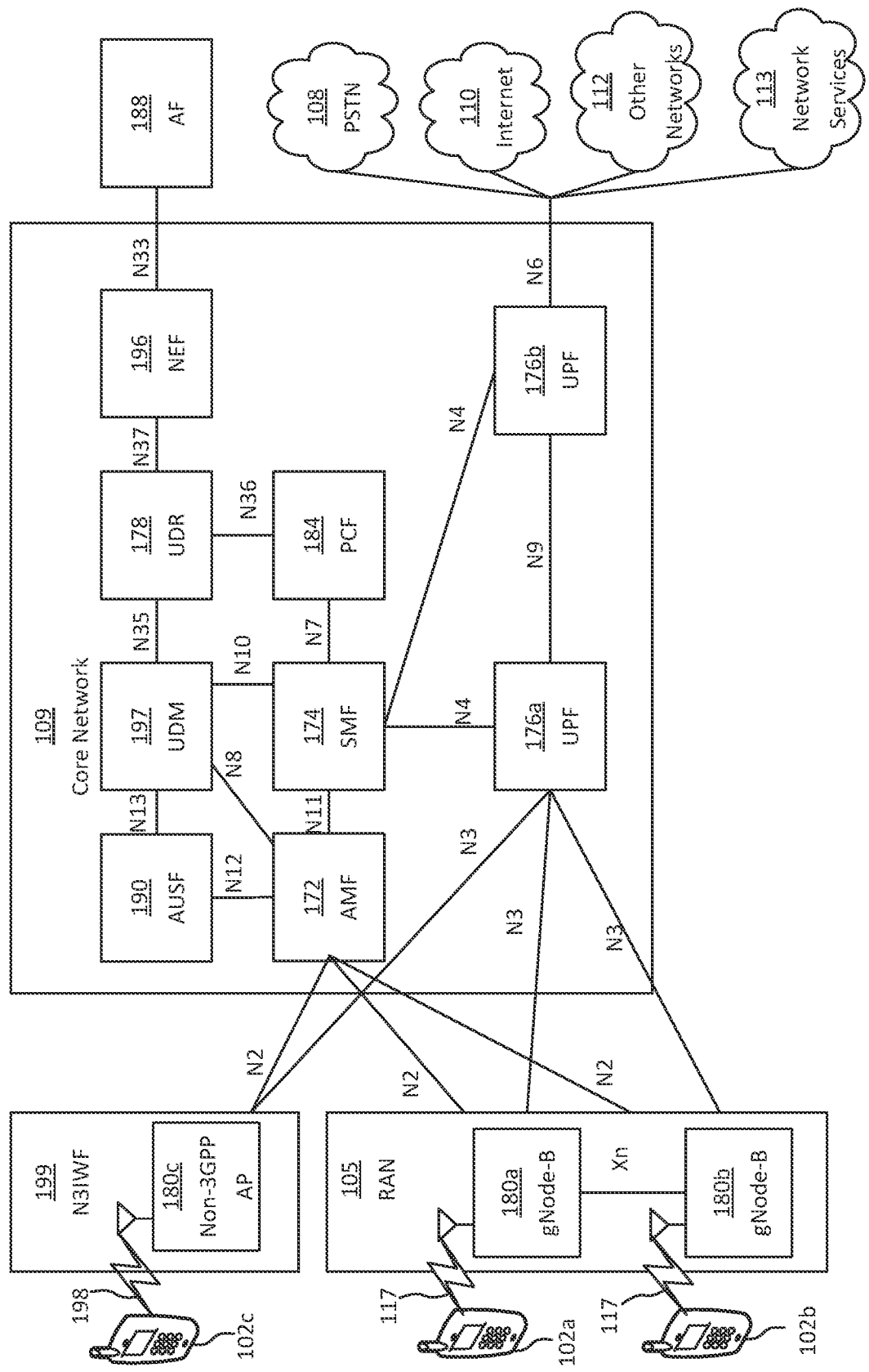

FIG. 26D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 26D, the gNode-Bs 180a and 180b may communicate with one another over an Xn interface, for example.

The core network 109 shown in FIG. 26D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 26G.

In the example of FIG. 26D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 26D shows that network functions directly connect to one another, however, it should be appreciated that they may communicate via routing agents such as a diameter routing agent or message buses.

In the example of FIG. 26D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 26D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 26D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a useful tool that network operators can use to support the diverse set of 5G use cases (e.g., massive IoT, critical communications, V2X, and enhanced mobile broadband) which demand diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 26D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIG. 26A, FIG. 26C, FIG. 26D, and FIG. 26E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 26A-E are provided by way of example only, and it is understood that the subject matter disclosed and claimed herein may be embodied or implemented in any similar communication system, whether presently defined or defined in the future.

Figure 26E:
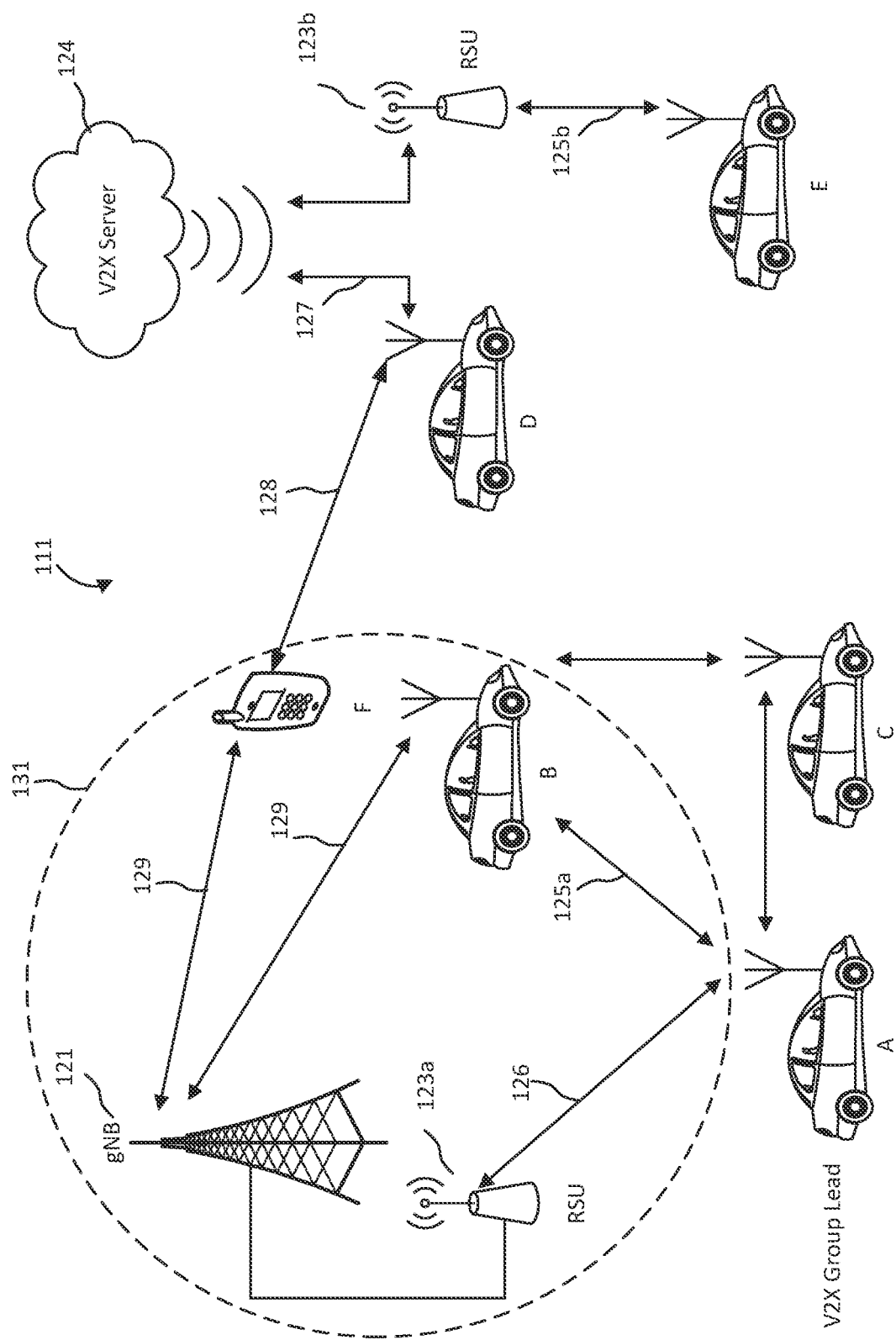
FIG. 26E illustrates another example communications system.

FIG. 26E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 26E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 26E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 26F:
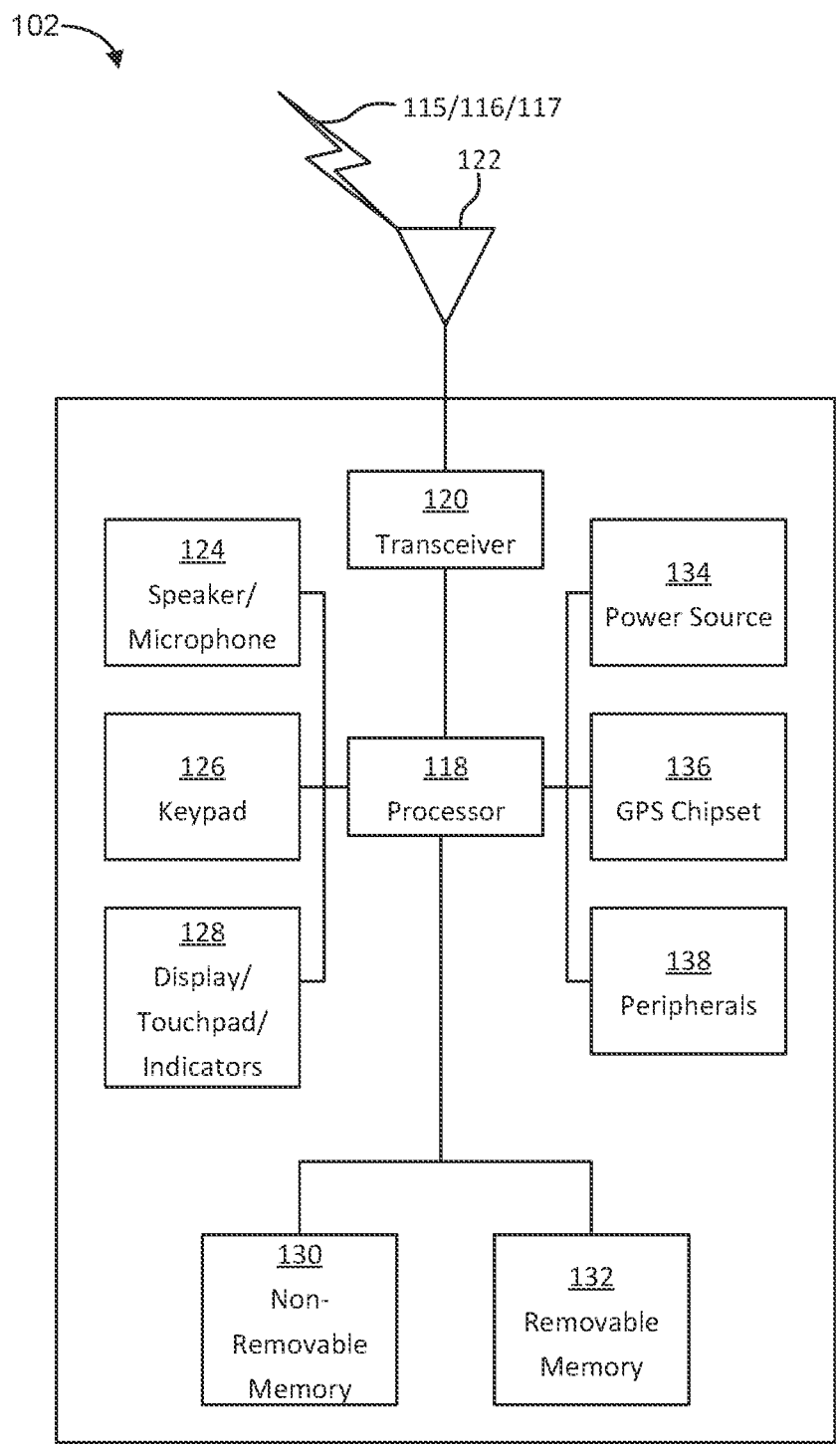
FIG. 26F is a block diagram of an example apparatus or device, such as a WTRU.

FIG. 26F is a block diagram of an example apparatus or device WTRU 102 that may be configured for wireless communications and operations in accordance with the systems, methods, and apparatuses described herein, such as a WTRU 102 of FIGS. 26A-E. As shown in FIG. 26F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 26F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 26F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 26A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 26F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 26G:
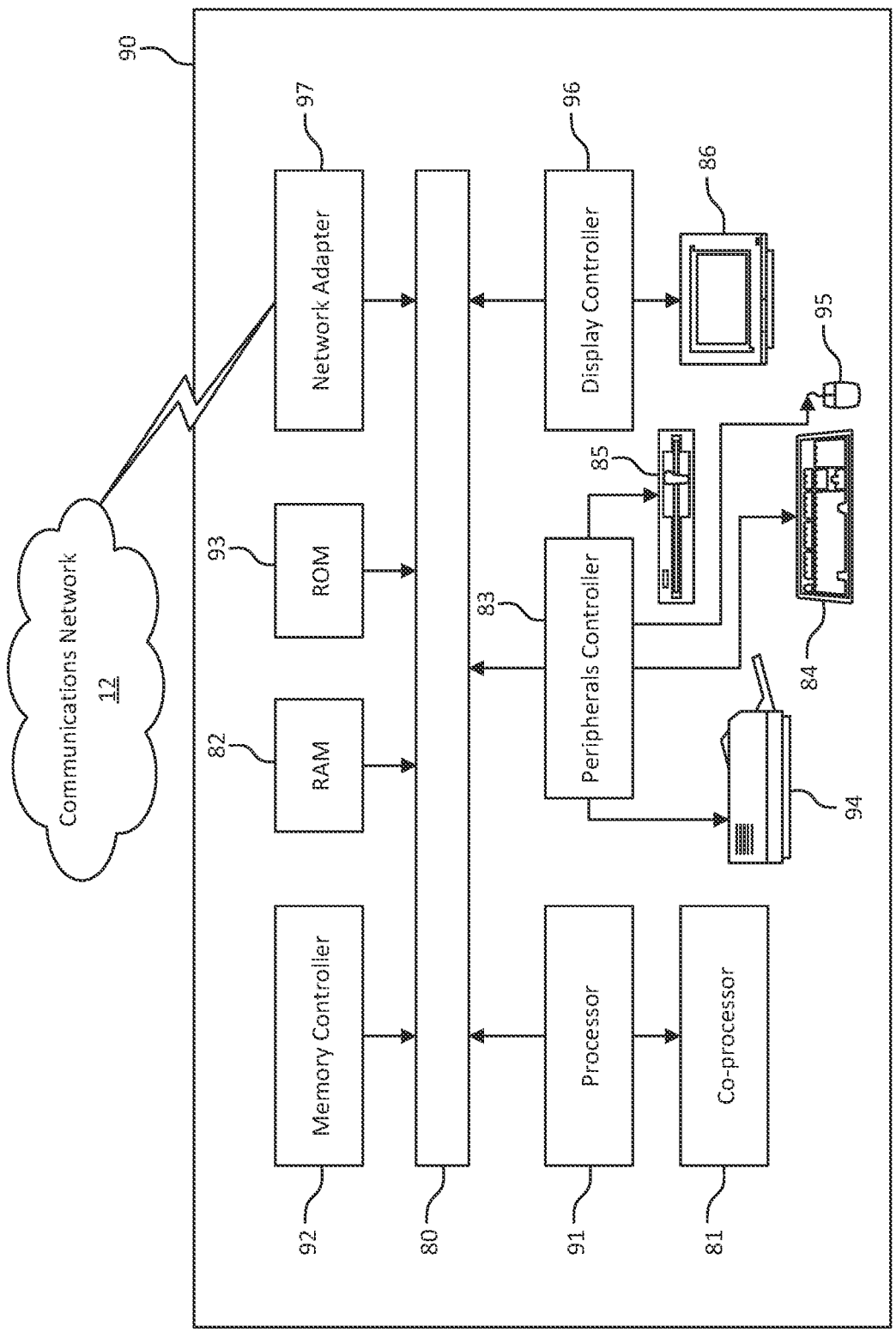
FIG. 26G is a block diagram of an exemplary computing system.

FIG. 26G is a block diagram of an exemplary computing system 90 in which one or more apparatuses of the communications networks illustrated in FIG. 26A, FIG. 26C, FIG. 26D and FIG. 26E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 26A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

APPENDIX

TABLE 1

Example of Short Message Indicator field

| Bit field | Short Message indicator |
|---|---|
| 00 | Paging DCI is used for scheduling MBS transmission |
| 01 | Only scheduling information for Paging is present in the DCI |
| 10 | Only short message is present in the DCI |
| 11 | Both scheduling information for Paging and short message are present in the DCI |

TABLE 2

Example of Short Message field with bit 4 used for indicating the DCI is used for scheduling MBS

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present.<br>If set to 1: indication that the UE may stop monitoring PDCCH occasion(s) for paging in this Paging Occasion as specified in TS 38.304, clause 7.1. |

TABLE 2-continued

Example of Short Message field with bit 4 used for indicating the DCI is used for scheduling MBS

| Bit | Short Message |
|---|---|
| 4 | MBSSchedulingIndication<br>If set to 1: indication that the paging DCI is used for scheduling MBS transmission. |
| 5-8 | Not used in this release of the specification and shall be ignored by UE if received. |

TABLE 3

Example of Short Message Indicator field

| Bit field | Short Message indicator |
|---|---|
| 00 | Paging DCI is used for activating MBS SPS PDSCH transmission |
| 01 | Only scheduling information for Paging is present in the DCI |
| 10 | Only short message is present in the DCI |
| 11 | Both scheduling information for Paging and short message are present in the DCI |

TABLE 4

Example of Short Message field with bit 4 used for indicating the DCI is used for activating the MBS SPS transmission in RRC idle/inactive

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present.<br>If set to 1: indication that the UE may stop monitoring PDCCH occasion(s) for paging in this Paging Occasion as specified in TS 38.304, clause 7.1. |
| 4 | MBSSPSActivation<br>If set to 1: indication that the paging DCI is used for activating MBS SPS PDSCH transmission. |
| 5-8 | Not used in this release of the specification and shall be ignored by UE if received. |

TABLE 5

Selected Abbreviations

| BWP | Bandwidth Part |
|---|---|
| CORESET | Control Resource Set |
| CS | Configured Scheduling |
| CSI | Channel State Information |
| CSS | Common Search Space |
| DCI | Downlink Control Information |
| DL-SCH | Downlink Shared Channel |
| DMRS | Demodulation Reference Signal |
| FDM | Frequency-Division Multiplexing |
| FDRA | Frequency Domain Resource Assignment |
| GSS | Group Search Space |
| G-RNTI | Group Radio Network Temporary Identifier |
| HARQ | Hybrid Automatic Repeat Request |
| IIOT | Industrial Internet of Things |
| LSB | Least Significant Bit |
| LTE | Long Term Evolution |
| MAC | Medium Access Control |
| MAC-CE | MAC Control Element |

TABLE 5-continued

Selected Abbreviations

| | |
|---|---|
| MBMS | Multimedia broadcast multicast services |
| MBS | Multicast/Broadcast Service |
| MBS-MCCH | Multicast/Broadcast Service Multicast Control Channel |
| MBS-MTCH | Multicast/Broadcast Service Multicast Traffic Channel |
| MBSFN | Multicast-Broadcast Single Frequency Network |
| MCS | Modulation Coding Scheme |
| MIB | Master Information Block |
| MSB | Most Significant Bit |
| MO | Monitoring Occasion |
| NR | New Radio |
| OSI | Other System Information |
| PDCCH | Physical Downlink Control Channel |
| PDSCH | Physical Downlink Shared Channel |
| PSCCH | Physical Sidelink Control Channel |
| PSFCH | Physical Sidelink Feedback Channel |
| PSSCH | Physical Sidelink Shared Channel |
| PMCH | Physical Multicast Channel |
| PUCCH | Physical Uplink Control Channel |
| QCL | Quasi Co Location |
| Qos | Quality of Service |
| RE | Resource Element |
| RMSI | Remain Minimum System Information |
| RNTI | Radio Network Temporary Identifier |
| RRC | Radio Resource Control |
| RV | Redundancy Version |
| SC-MCCH | Single-Cell Multicast Control Channel |
| SC-MTCH | Single-Cell Multicast Traffic Channel |
| SC-PTM | Single-Cell Point to Multipoint |
| SFN | System Frame Number |
| SIB | System Information Block |
| SINR | Signal to Interference & Noise Ratio |
| SPS | Semi-persistent Scheduling |
| TB | Transmission Block |
| TDM | Time-Division Multiplexing |
| TMGI | Temporary Mobile Group Identity |
| TPC | Transmission Power Control |
| TU | Time Unit |
| UE | User Equipment |

What is claimed is:

1. An apparatus comprising a processor, communications circuitry, a memory, and instructions stored in the memory which, when executed by the processor, cause the apparatus to:
   receive one or more system information blocks (SIBs) containing control information indicating a second frequency region to monitor for Multicast/Broadcast Service (MBS) communications, wherein the control information comprises a first physical resource block (PRB) and a total number of PRBs for the second frequency region;
   monitor, while the apparatus is operating in a Radio Resource Control (RRC) idle state or a RRC inactive state, a first frequency region, the first frequency region being an initial Bandwidth Part (BWP); and
   monitor, while the apparatus is operating in the RRC idle state or the RRC inactive state, the second frequency region to receive an MBS communication, the second frequency region being an MBS frequency region and an extended first frequency region, wherein the first frequency region is contained within the second frequency region in a frequency domain.

2. The apparatus of claim 1, wherein the instructions, when executed, further cause the apparatus to monitor the second frequency region during a monitoring occasion during an MBS transmission window, and wherein a location of the monitoring occasion is determined according to a number of SIBs of a beamsweeping configuration for transmitting the MBS communication, a number of monitoring occasions of the MBS transmission window, a number of repetitions of the number of SIBS of the beamsweeping configuration, or a combination thereof.

3. The apparatus of claim 1, wherein the instructions, when executed by the processor, further cause the apparatus to:
   receive, while monitoring the first frequency region and during an MBS time unit (TU), an MBS communication.

4. The apparatus of claim 3, wherein the instructions, when executed by the processor, further cause the apparatus to switch from monitoring the first frequency region to monitoring the second frequency region based on determining that the MBS TU at least partially overlaps with a TU of the initial BWP.

5. The apparatus of claim 4, wherein the instructions, when executed by the processor, further cause the apparatus to switch from monitoring the second frequency region to monitoring the first frequency region based on determining that the TU of the initial BWP and the MBS TU have ended.

6. The apparatus of claim 1, wherein the instructions, when executed by the processor, further cause the apparatus to:
   receive, while monitoring the first frequency region, downlink control information (DCI) indicative of a scheduled MBS communication; and
   switch from monitoring the first frequency region to monitoring the second frequency region based on the received DCI.

7. The apparatus of claim 6, wherein the DCI comprises a paging DCI, and wherein a Short Messages field or a Short Messages Indicator field of the paging DCI indicates the scheduled MBS communication.

8. The apparatus of claim 1, wherein the instructions, when executed by the processor, further cause the apparatus to receive the one or more SIB while the apparatus is in the RRC idle state or the RRC inactive state.

9. The apparatus of claim 1, wherein the second frequency region is associated with an identifier of an MBS service stored by the apparatus, and wherein the instructions, when executed by the processor, further cause the apparatus to monitor the second frequency region based on the apparatus subscribing to receive MBS communications of the MBS service.

10. The apparatus of claim 9, wherein the identifier comprises a Temporary Mobile Group Identify (TMGI) or a Radio Network Temporary Identifier (RNTI).

11. The apparatus of claim 1, wherein the instructions, when executed by the processor, further cause the apparatus to:
   receive, while monitoring the first frequency region, a reference signal indicative of a scheduled MBS communication; and
   switch from monitoring the first frequency to monitoring the second frequency region based on the received reference signal.

12. The apparatus of claim 11, wherein the reference signal comprises a channel state information reference signal (CSI-RS) or a transmission reference signal (TRS).

13. The apparatus of claim 11, wherein the reference signal comprises a modulation and coding scheme (MCS) value, time domain offset, a demodulation reference signal (DMRS) configuration, a DMRS sequence initializer, or a combination thereof, for the scheduled MBS communication.

14. A method performed by a wireless transmit/receive unit (WTRU), comprising:

receiving one or more system information blocks (SIBs) containing control information indicating a second frequency region to monitor for Multicast/Broadcast Service (MBS) communications, wherein the control information comprises a first physical resource block (PRB) and a total number of PRBs for the second frequency region;

monitoring, while the WTRU is operating in a Radio Resource Control (RRC) idle state or a RRC inactive state, a first frequency region, the first frequency region being an initial Bandwidth Part (BWP); and monitoring, while the WTRU is operating in the RRC idle state or the RRC inactive state, the second frequency region to receive an MBS communication, the second frequency region being an MBS frequency region and an extended first frequency region, wherein the first frequency region is contained within the second frequency region in a frequency domain.

15. The method of claim 14, wherein the monitoring the second frequency region occurs during a monitoring occasion during an MBS transmission window, and wherein a location of the monitoring occasion is determined according to a number of SIBs of a beamsweeping configuration for transmitting the MBS communication, a number of monitoring occasions of the MBS transmission window, a number of repetitions of the number of SIBs of the beamsweeping configuration, or a combination thereof.

16. The method of claim 14, further comprising:
receiving, during the monitoring the first frequency region and during an MBS time unit (TU), an MBS communication.

17. The method of claim 16, further comprising:
switching from monitoring the first frequency region to monitoring the second frequency region based on determining that the MBS TU at least partially overlaps with a TU of the initial BWP.

18. The method of claim 17, further comprising:
switching from monitoring the second frequency region to monitoring the first frequency region based on determining that the TU of the initial BWP and the MBS TU have ended.

19. The method of claim 14, further comprising:
receiving, during the monitoring the first frequency region, downlink control information (DCI) indicative of a scheduled MBS communication; and
switching, from monitoring the first frequency region to monitoring the second frequency region based on the received DCI.

20. The method of claim 19, wherein the DCI comprises a paging DCI, and wherein a Short Messages field or a Short Messages Indicator field of the paging DCI indicates the scheduled MBS communication.

* * * * *